United States Patent
Wang et al.

(10) Patent No.: US 12,183,059 B2
(45) Date of Patent: Dec. 31, 2024

(54) AI-BASED OBJECT CLASSIFICATION METHOD AND APPARATUS, AND MEDICAL IMAGING DEVICE AND STORAGE MEDIUM

(71) Applicant: TENCENT TECHNOLOGY (SHENZHEN) COMPANY LIMITED, Guangdong (CN)

(72) Inventors: Liang Wang, Shenzhen (CN); Jiarui Sun, Shenzhen (CN); Rongbo Shen, Shenzhen (CN); Cheng Jiang, Shenzhen (CN); Yanchun Zhu, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 440 days.

(21) Appl. No.: 17/686,950

(22) Filed: Mar. 4, 2022

(65) Prior Publication Data

US 2022/0189142 A1    Jun. 16, 2022

Related U.S. Application Data

(63) Continuation of application No. PCT/CN2020/126620, filed on Nov. 5, 2020.

(30) Foreign Application Priority Data

Feb. 17, 2020 (CN) .......................... 202010096186.0

(51) Int. Cl.
*G06V 10/26* (2022.01)
*G06T 3/4038* (2024.01)
(Continued)

(52) U.S. Cl.
CPC .......... *G06V 10/764* (2022.01); *G06T 3/4038* (2013.01); *G06V 10/26* (2022.01); *G06V 10/82* (2022.01)

(58) Field of Classification Search
CPC ...... G06V 10/764; G06V 10/70; G06V 10/82; G06V 10/454; G06V 10/26;
(Continued)

(56) References Cited

U.S. PATENT DOCUMENTS 10,803,328 B1 * 10/2020 Bai .................. G06V 20/58
2018/0232887 A1 * 8/2018 Lin .................. G06T 7/11
(Continued)

FOREIGN PATENT DOCUMENTS

CN 107748889 A 3/2018
CN 108304841 A 7/2018
(Continued)

OTHER PUBLICATIONS

Lowe, "How to Create Segmentation Masks with Roboflow"; https://blog.roboflow.com/how-to-create-segmentation-masks-with-roboflow/; (Year: 2022).*
(Continued)

*Primary Examiner* — Gandhi Thirugnanam
*Assistant Examiner* — Michael Adam Shariff
(74) *Attorney, Agent, or Firm* — Sughrue Mion, PLLC

(57) ABSTRACT

An AI-based object classification method and apparatus, a computer-readable storage medium, and a computer device. The method includes: obtaining a target image to be processed, the target image including a target detection object; separating a target detection object image of the target detection object from the target image; inputting the target detection object image into a feature object prediction model to obtain a feature object segmentation image of a feature object in the target detection object image; obtaining quan-
(Continued)

titative feature information of the target detection object according to the target detection object image and the feature object segmentation image; and classifying the target detection object image according to the quantitative feature information to obtain category information of the target detection object in the target image.

16 Claims, 13 Drawing Sheets

(51) Int. Cl.
*G06V 10/764* (2022.01)
*G06V 10/82* (2022.01)

(58) Field of Classification Search
CPC . G06T 2207/20084; G06T 2207/20021; G06T 3/4038; G06T 7/10; G06T 7/11; G06N 3/02; G06N 3/0464; G06N 3/04; G06N 3/045; G06N 20/00; G06N 3/0455
See application file for complete search history.

(56) References Cited

U.S. PATENT DOCUMENTS

| | | | |
|---|---|---|---|
| 2019/0295260 A1* | 9/2019 | Mehta | G06N 3/045 |
| 2020/0005460 A1 | 1/2020 | Dou et al. | |
| 2021/0158533 A1* | 5/2021 | Cui | G06T 1/20 |

FOREIGN PATENT DOCUMENTS

| | | | | |
|---|---|---|---|---|
| CN | 109697460 A | 4/2019 | | |
| CN | 109886282 A | 6/2019 | | |
| CN | 109949302 A | 6/2019 | | |
| CN | 110276411 A | 9/2019 | | |
| CN | 110570421 A | 12/2019 | | |
| CN | 110610181 A | 12/2019 | | |
| CN | 110796656 A * | 2/2020 | ........... | G06K 9/3233 |
| CN | 111311578 A | 6/2020 | | |
| WO | WO-2021046715 A1 * | 3/2021 | ........... | H04N 5/2353 |

OTHER PUBLICATIONS

International Search Report of PCT/CN2020/126620 dated Feb. 5, 2021 [PCT/ISA/210].
Written Opinion of PCT/CN2020/126620 dated Feb. 5, 2021 [PCT/ISA/237].

* cited by examiner

Labeled region 310

Mammary duct prediction sub-image 704

Target detection object image | Feature object prediction model | Feature object segmentation image

AI-BASED OBJECT CLASSIFICATION METHOD AND APPARATUS, AND MEDICAL IMAGING DEVICE AND STORAGE MEDIUM

CROSS-REFERENCE TO RELATED APPLICATION(S)

This application is a continuation application of International Application No. PCT/CN2020/126620, filed on Nov. 5, 2020, which claims priority to Chinese Patent Application No. 202010096186.0, filed with the China National Intellectual Property Administration on Feb. 17, 2020, the disclosures of which are incorporated by reference in their entireties.

FIELD

The disclosure relates to the field of image processing technologies, and in particular, to an AI-based object classification method and apparatus, a computer-readable storage medium, a computer device, and a medical imaging device.

BACKGROUND

With the development of image processing technologies, it is increasingly common to apply the image processing technologies to the medical field to achieve the recognition or classification of different objects in medical images. In conventional object classification technologies, medical images are usually classified directly. However, the conventional object classification technologies are relatively rough, which is likely to cause misclassification, resulting in low classification accuracy.

SUMMARY

According to various embodiments provided in the disclosure, an AI-based object classification method and apparatus, a computer-readable storage medium, a computer device, and a medical imaging device are provided.

According to an aspect of the embodiments of the disclosure, an AI-based object classification method may be provided, including: obtaining a target image to be processed, the target image including a target detection object; separating a target detection object image of the target detection object from the target image; inputting the target detection object image into a feature object prediction model to obtain a feature object segmentation image of a feature object in the target detection object image; obtaining quantitative feature information of the target detection object according to the target detection object image and the feature object segmentation image; and classifying the target detection object image according to the quantitative feature information to obtain category information of the target detection object in the target image.

According to an aspect of the embodiments of the disclosure, an AI-based object classification method may be provided, including: obtaining a mammary tissue pathological image, the mammary tissue pathological image including a mammary duct; separating a mammary duct image of the mammary duct from the mammary tissue pathological image; inputting the mammary duct image into a feature object prediction model to obtain a cell segmentation image of cells in the mammary duct image; obtaining cell feature information and sieve feature information according to the mammary duct image and the cell segmentation image; and classifying the mammary duct image according to the cell feature information and the sieve feature information to obtain lesion category information of the mammary duct in the mammary tissue pathological image.

According to an aspect of the embodiments of the disclosure, a medical imaging device may be provided, including: a microscope scanner, configured to obtain a mammary tissue pathological image; a memory, storing a computer-readable instruction; a processor, the computer-readable instruction, when executed by the processor, causing the processor to perform the following operations: separating a mammary duct image of a mammary duct from the mammary tissue pathological image; inputting the mammary duct image into a feature object prediction model to obtain a cell segmentation image of cells in the mammary duct image; obtaining cell feature information and sieve feature information according to the mammary duct image and the cell segmentation image; and classifying the mammary duct image according to the cell feature information and the sieve feature information to obtain lesion category information of the mammary duct in the mammary tissue pathological image; and a display, configured to display the mammary tissue pathological image and the lesion category information of the mammary duct in the mammary tissue pathological image.

According to an aspect of the embodiments of the disclosure, an AI-based object classification apparatus may be provided, including: an image obtaining module, configured to obtain a target image, the target image including a target detection object; an image segmentation module, configured to separate a target detection object image of the target detection object from the target image; a feature image obtaining module, configured to input the target detection object image into a feature object prediction model to obtain a feature object segmentation image of a feature object in the target detection object image; a feature information obtaining module, configured to obtain quantitative feature information of the target detection object according to the target detection object image and the feature object segmentation image; and an object classification module, configured to classify the target detection object image according to the quantitative feature information to obtain category information of the target detection object in the target image.

According to an aspect of the embodiments of the disclosure, an AI-based object classification apparatus may be provided, including: a pathological image obtaining module, configured to obtain a mammary tissue pathological image, the mammary tissue pathological image including a mammary duct; a duct image obtaining module, configured to separate a mammary duct image of the mammary duct from the mammary tissue pathological image; a cell region image obtaining module, configured to input the mammary duct image into a feature object prediction model to obtain a cell segmentation image of cells in the mammary duct image; a duct feature obtaining module, configured to obtain cell feature information and sieve feature information according to the mammary duct image and the cell segmentation image; and a duct classification module, configured to classify the mammary duct image according to the cell feature information and the sieve feature information to obtain lesion category information of the mammary duct in the mammary tissue pathological image.

According to an aspect of the embodiments of the disclosure, one or more non-volatile storage media may be provided, storing a computer-readable instruction, the computer-readable instruction, when executed by one or more processors, causing the one or more processors to implement the methods according to the foregoing embodiments. According to an aspect of the embodiments of the disclosure, a computer device may be provided, including a memory, a processor, and a computer-readable instruction stored in the memory and executable by the processor, the processor, when executing the computer-readable instruction, implementing the methods according to the foregoing embodiments.

Details of one or more embodiments of the disclosure are provided in the accompanying drawings and descriptions below. Other features, objectives, and advantages of the disclosure become apparent from the specification, the drawings, and the claims.

BRIEF DESCRIPTION OF THE DRAWINGS

To describe the technical solutions in the embodiments of the disclosure more clearly, the following briefly describes the accompanying drawings required for describing the embodiments. The accompanying drawings in the following description show merely some embodiments of the disclosure, and a person skilled in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
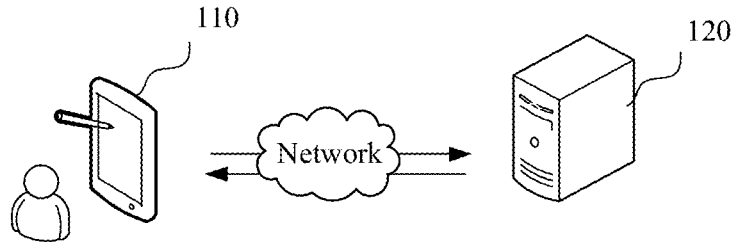
FIG. 1 is an application environment diagram of an AI-based object classification method according to an embodiment.

To make objectives, technical solutions, and advantages of the disclosure clearer and more comprehensible, the disclosure is further described in detail with reference to the accompanying drawings and embodiments. It is to be understood that the specific embodiments described herein are only used for explaining the disclosure, and are not used for limiting the disclosure.

Artificial Intelligence (AI) is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology of computer science, which attempts to understand the essence of intelligence and produce a new type of intelligent machine that can react in a similar way to human intelligence. AI is to study design principles and implementation methods of various intelligent machines so that the machines have the functions of perception, reasoning, and decision-making.

The AI technology is a comprehensive discipline, covering a wide range of fields, and including both a hardware-level technology and a software-level technology. Basic AI technologies generally include technologies such as sensor, dedicated AI chip, cloud computing, distributed storage, a big data processing technology, operation/interaction system, and mechatronics. AI software technologies mainly include several major directions such as a computer vision technology, a speech processing technology, a natural language processing technology, and machine learning/deep learning (DL).

Computer vision (CV) is a science that studies how to enable a machine to "see", and to be specific, to implement machine vision such as recognition, tracking, measurement, and the like for a target by using a camera and a computer in replacement of human eyes, and further perform graphic processing so that the computer processes the target into an image more suitable for human eyes to observe, or more suitable to be transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, 3D object reconstruction, a 3D technology, virtual reality, augmented reality, synchronous positioning, and map construction, and further include biometric feature recognition technologies such as common face recognition and fingerprint recognition.

Machine Learning (ML) is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving performance of the computer. ML is the core of AI, is a basic way to make the computer intelligent, and is applied to various fields of AI. ML and DL generally include technologies such as an artificial neural network, a belief network, reinforcement learning, transfer learning, inductive learning, and learning from demonstrations.

FIG. 1 is an application environment diagram of an AI-based object classification method according to an embodiment. Referring to FIG. 1, the object classification method is applied to an object classification system. The object classification system includes a terminal 110 and a server 120. The terminal 110 and the server 120 are connected by a network. The terminal 110 may be specifically a desktop terminal or a mobile terminal. The mobile terminal may be specifically at least one of a mobile phone, a tablet computer, a notebook computer, and the like. The server 120 may be implemented by an independent server or a server cluster that includes a plurality of servers.

Specifically, the terminal 110 obtains a target image to be processed and transmits the target image to the server 120. The server 120 separates a target detection object image of a target detection object from the target image; inputs the target detection object image into a feature object prediction model to obtain a feature object segmentation image of a feature object in the target detection object image; obtains quantitative feature information of the target detection object according to the target detection object image and the feature object segmentation image; and classifies the target detection object image according to the quantitative feature information to obtain category information of the target detection object in the target image. Further, the server 120 returns the target image, the target detection object image of the target detection object in the target image, and the category information of the target detection object in the target image to the terminal 110, and the terminal 110 displays these images and the category information.

Figure 2:
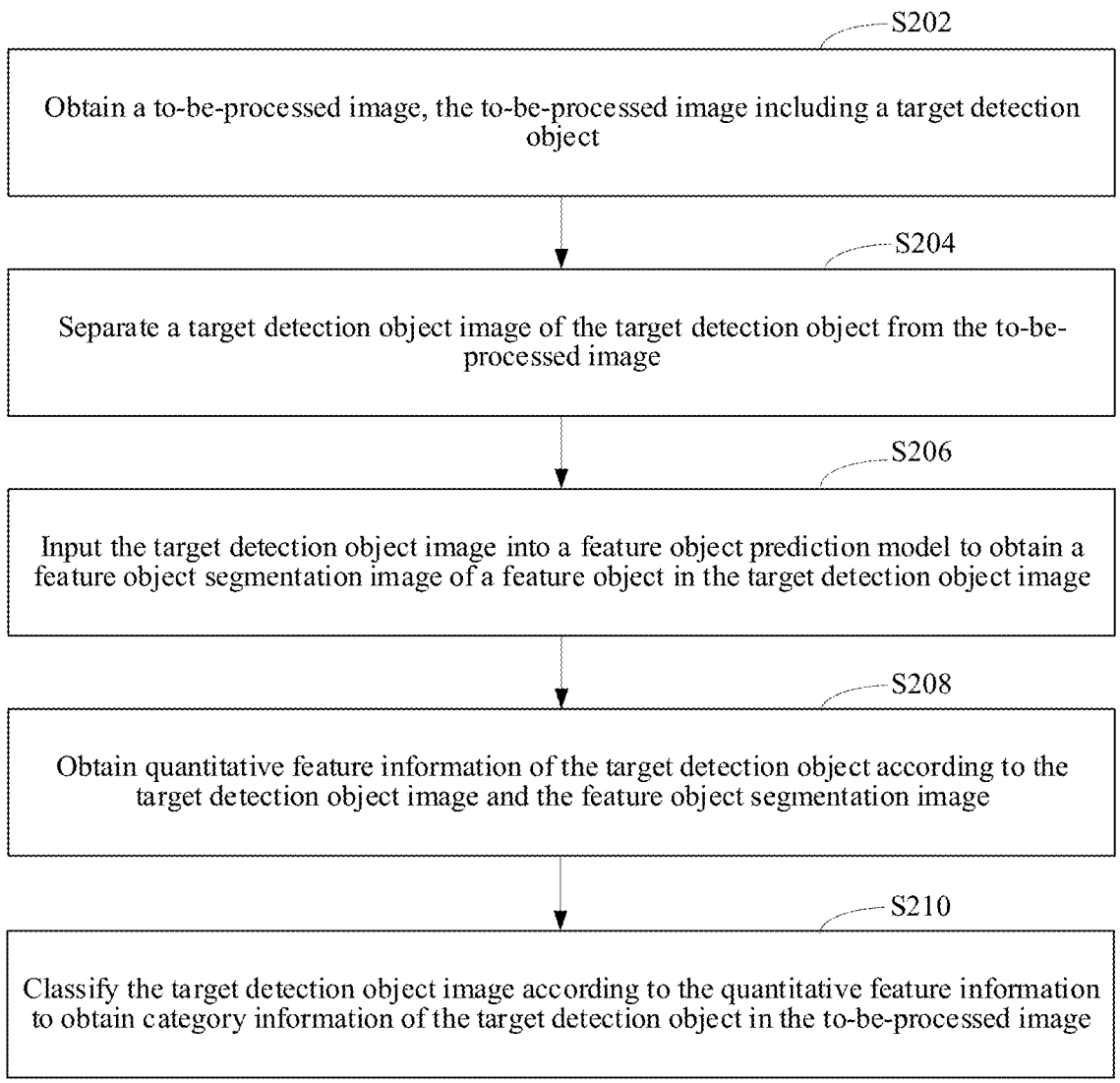
FIG. 2 is a schematic flowchart of an AI-based object classification method according to an embodiment.

As shown in FIG. 2, in an embodiment, an AI-based object classification method is provided. This embodiment is described by using an example in which the method is applied to the server 120 in FIG. 1. Referring to FIG. 2, the AI-based object classification method specifically includes the following operations:

Operation S202. Obtain a target image (or referred to as the to-be-processed image), the target image including a target detection object.

The target image includes, but is not limited to, a picture, a film, and the like, specifically an image obtained through an apparatus such as a camera or a scanner, an image obtained by taking a screenshot, or an image uploaded through application programs that can upload images. The target image includes one or more target detection objects. The target detection object refers to an object that needs to be detected and classified in the target image.

In an actual application scenario, the target image may be, but is not limited to, a pathological slide image, and the target detection object may be, but is not limited to, body organs, tissues, or cells in the pathological slide image. The pathological slide image may be specifically an image taken by a medical imaging device (such as a digital pathological slide scanner or a digital slide microscope), for example, may be a whole slide image (WSI).

Figure 3:
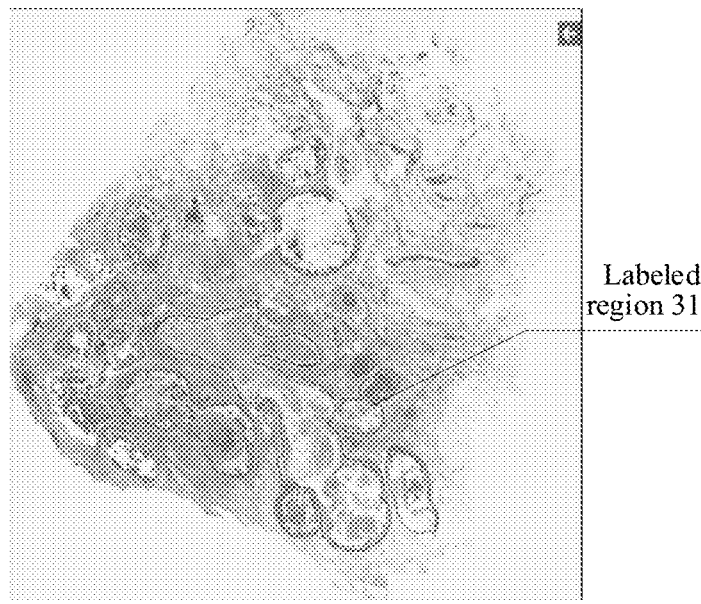
FIG. 3 is a schematic diagram of a mammary tissue pathological image according to an embodiment.

In an embodiment, the target image is a mammary tissue pathological image, and the target detection object is a mammary duct. FIG. 3 is a schematic diagram of a mammary tissue pathological image according to an embodiment. As shown in FIG. 3, a labeled region 310 is a target detection object, that is, a mammary duct.

Operation S204. Separate a target detection object image of the target detection object from the target image.

The target detection object image refers to a region image of a region where the target detection object is located in the target image. After the target image is obtained, the region image of the region where the target detection object is located may be separated from the target image. The region image is the target detection object image.

Specifically, separating a target detection object image of the target detection object from the target image may include determining a region where the target detection object is located from the target image by using an image segmentation algorithm, and then cropping a region image of the region where the target detection object is located as the target detection object image of the target detection object, where the image segmentation algorithm may include a threshold-based segmentation algorithm, an edge detection-based segmentation method, and the like; or may include inputting the target image into a DL model for image segmentation, predicting a region where the target detection object is located by using the DL model, and then cropping a region image of the region where the target detection object is located from the target image according to the predicted region where the target detection object is located as the target detection object image of the target detection object.

Operation S206. Input the target detection object image into a feature object prediction model to obtain a feature object segmentation image of a feature object in the target detection object image.

The feature object refers to an object including feature information of the target detection object in the target detection object. In an actual application scenario, using an example in which the target image is a pathological slide image, and the target detection object is a body tissue, the feature object of the target detection object may be cells of the body tissue.

The feature object segmentation image refers to an image with a labeled region where the feature object is located and with a size that is the same as the target detection object image. In an embodiment, the feature object segmentation image may be a binary image, that is, the feature object segmentation image shows a visual effect of only black and white. For example, in the feature object segmentation image, from the target detection object image, a region where a feature object is located may be displayed as white, and a region where no feature object is located may be displayed as black.

The feature object prediction model is a network model used to determine whether each pixel in the target detection object image pertains to the feature object to output the feature object segmentation image. The feature object prediction model herein is a trained network model directly used to determine whether each pixel in the target detection object image pertains to the feature object to output the feature object segmentation image. The feature object prediction model may include a fully convolutional network (FCN) structure, a convolutional neural network (U-net) structure, and the like. This is not limited herein. Specifically, the feature object prediction model includes, but is not limited to, an encoder and a decoder. The encoder is used to encode and compress the target detection object image, and extract a low-level semantic feature image with a lower dimension. The decoder is used to perform a decoding operation on the low-level semantic feature image outputted by the encoder, and output the feature object segmentation image with a size that is the same as the target detection object image.

Operation S208. Obtain quantitative feature information of the target detection object according to the target detection object image and the feature object segmentation image.

The quantitative feature information refers to information about quantified features of the feature object in the target detection object, such as a quantity, a size, a circularity, and a grayscale value of pixels of the feature object in the target detection object.

After the target detection object image and the feature object segmentation image corresponding to the target detection object image are obtained, the quantitative feature information of the target detection object may be calculated according to image data of the target detection object image and the feature object segmentation image.

Specifically, a region where the feature object is located may be obtained from the feature object segmentation image, a region corresponding to the region where the feature object is located may be determined from the target detection object image, an image of the region may be determined as a region image of the feature object, and finally the quantitative feature information may be calculated according to pixel information of pixels in the region image of the feature object.

Operation S210. Classify the target detection object image according to the quantitative feature information to obtain category information of the target detection object in the target image.

After the quantitative feature information of the target detection object image is obtained, the target detection object image may be classified according to the quantitative feature information of the target detection object image to obtain the category information of the target detection object corresponding to the target detection object image.

Specifically, classifying the target detection object image according to the quantitative feature information may include inputting the quantitative feature information of the target detection object image into a trained classifier, and classifying the target detection object image by using the classifier. The classifier may be an ML-based classifier, for example, a support vector machine (SVM) classifier, or may be a DL-based classifier, for example, a convolutional neural network (CNN)-based classifier.

Further, in an embodiment, the training of the classifier may specifically include obtaining a sample detection object image and a standard category label corresponding to the sample detection object image, inputting the sample detection object image into a pre-constructed classifier to obtain a predicted category label corresponding to the sample detection object image, then calculating a loss value of the classifier by comparing the standard category label with the predicted category label of the sample detection object image, and finally adjusting parameters of the classifier according to the loss value of the classifier to obtain a trained classifier.

In the foregoing AI-based object classification method, after a target image is obtained, a target detection object image is separated from the target image, so that the separation of a single target detection object from the target image can reduce effects on subsequent object classification by unnecessary image data; then feature object detection is performed on the single target detection object to obtain a feature object segmentation image, and quantitative feature information of a feature object is obtained from the target detection object image according to a region where the feature object is located that is labeled in the feature object segmentation image, so that feature information of the feature object in the target detection object is quantified to obtain the quantitative feature information; and then the target detection object is classified according to the quantitative feature information. Therefore, the cascade processing of the target image is achieved, the unnecessary image data in the target image is effectively reduced, the effects on object classification by the unnecessary image data in the target image is reduced, and the accuracy of classification of the target detection object from the target image is improved.

Figure 4:
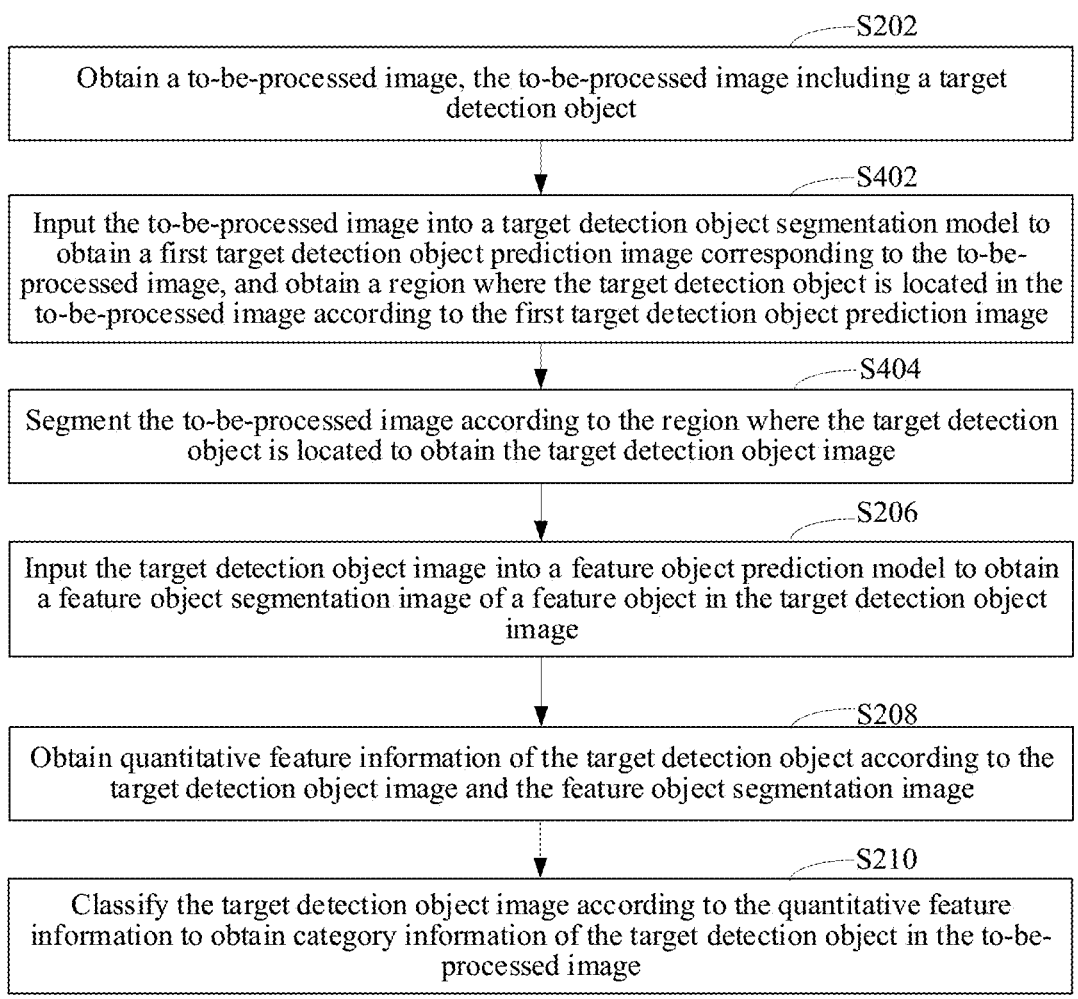
FIG. 4 is a schematic flowchart of an operation of cutting a target detection object image according to an embodiment.

In an embodiment, as shown in FIG. 4, the operation S204 of separating a target detection object image of the target detection object from the target image includes the following operations:

Operation S402. Input the target image into a target detection object segmentation model to obtain a first target detection object prediction image corresponding to the target image, and obtain a region where the target detection object is located in the target image according to the first target detection object prediction image.

Operation S404. Segment the target image according to the region where the target detection object is located to obtain the target detection object image.

The target detection object segmentation model is a network model used to determine whether each pixel in the target detection object image pertains to the target detection object to output the first target detection object prediction image. The target detection object segmentation model is a trained network model directly used to determine whether each pixel in the target image pertains to the target detection object to output the first target detection object prediction image. The target detection object segmentation model may include an FCN structure, a U-net structure, and the like. This is not limited herein. Specifically, the target detection object segmentation model includes, but is not limited to, an encoder and a decoder. The encoder is used to encode and compress the target image, and extract a low-level semantic feature image with a lower dimension. The decoder is used to perform a decoding operation on the low-level semantic feature image outputted by the encoder, and output the first target detection object prediction image with a size that is the same as the target image.

The first target detection object prediction image refers to an image with a labeled region where the target detection object is located and with a size that is the same as the target image. After the first target detection object prediction image is obtained, the region where the target detection object is located is obtained from the first target detection object prediction image so that the region where the target detection object is located in the target image is correspondingly determined, and the region where the target detection object is located in the target image is segmented to obtain the target detection object image.

In an embodiment, the first target detection object prediction image may be a binary image, that is, the first target detection object prediction image shows a visual effect of only black and white. For example, in the first target detection object prediction image, a region where a target detection object is located may be displayed as white, and a region where no target detection object is located may be displayed as black.

Specifically, inputting the target image into the target detection object segmentation model to obtain the first target detection object prediction image corresponding to the target image may include calculating a probability value that each pixel in the target image pertains to the target detection object by using the target detection object segmentation model, classifying the pixels in the target image by using the target detection object segmentation model according to the probability value to obtain pixels that pertain to the target detection object and pixels that do not pertain to the target detection object, and then, by using the target detection object segmentation model, setting a grayscale value of the pixels that pertain to the target detection object to 0, and setting a grayscale value of the pixels that do not pertain to the target detection object to 255, to obtain the first target detection object prediction image in which the region where the target detection object is located may be displayed as white, and the region where no target detection object is located may be displayed as black.

Figure 5A:
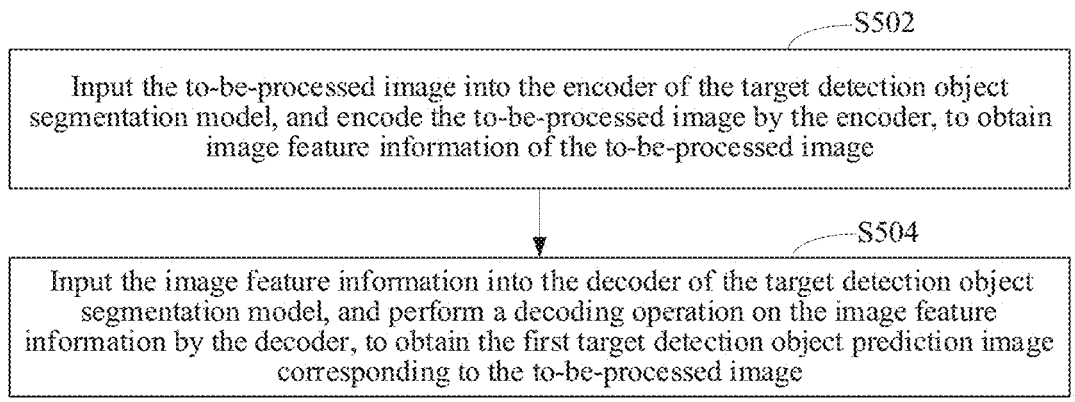
FIG. 5a is a schematic flowchart of an operation of obtaining a first target detection object prediction image according to an embodiment.

Further, in an embodiment, as shown in FIG. 5a, the target detection object segmentation model includes an encoder and a decoder; and the operation of inputting the target image into a target detection object segmentation model to obtain a first target detection object prediction image corresponding to the target image includes the following operations:

Operation S502. Input the target image into the encoder of the target detection object segmentation model, and encode the target image by the encoder, to obtain image feature information of the target image.

The encoder includes a plurality of convolutional layers. The encoder is connected to the decoder. The connection between the encoder and the decoder may be skip connection, which can improve the accuracy of classification of pixels.

Specifically, the target image is inputted into the encoder of the target detection object segmentation model, and the target image is encoded and compressed by using the encoder. Specifically, the encoder may encode and compress the target image by using the convolutional layers, and extract low-level semantic feature information of the target image. The low-level semantic feature information of the target image may be basic visual information of the target image, such as brightness, color, and texture.

Operation S504. Input the image feature information into the decoder of the target detection object segmentation model, and perform a decoding operation on the image feature information by the decoder, to obtain the first target detection object prediction image corresponding to the target image.

After the encoder outputs the low-level semantic feature information of the target image, the low-level semantic feature information of the target image is inputted into the decoder of the target detection object segmentation model, and the decoder performs a decoding operation on the low-level semantic feature information of the target image, to obtain the first target detection object prediction image that identifies whether each pixel in the target image pertains to the target detection object.

Specifically, the low-level semantic feature information of the target image that is extracted by the encoder is inputted into the decoder, and the decoder may perform a decoding operation on the low-level semantic feature information by using a deconvolutional layer and an up-sampling layer, to obtain the corresponding first target detection object prediction image. The first target detection object prediction image outputted by the decoder may be restored to an image with a size that is the same as the target image. Further, the first target detection object prediction image outputted by the decoder intuitively describes whether each pixel in the target image pertains to the target detection object, and shows the region where the target detection object is located.

Figure 5B:
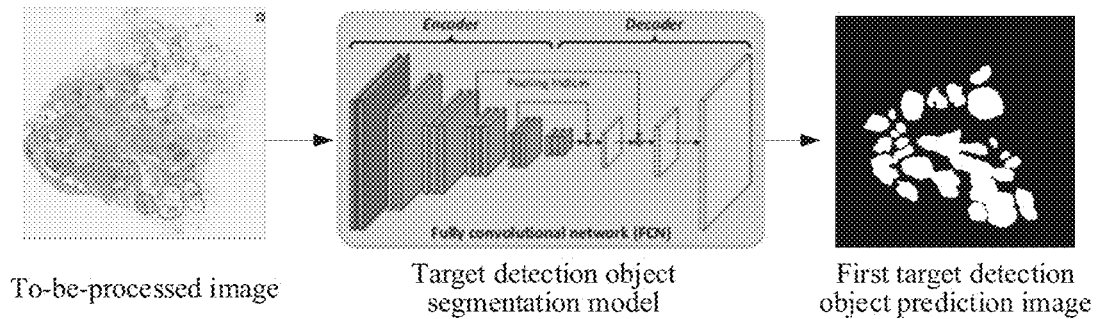
FIG. 5b is a principle frame diagram of a target detection object segmentation model according to an embodiment.

In an embodiment, FIG. 5b is a principle frame diagram of a target detection object segmentation model according to an embodiment. As shown in the frame of the target detection object segmentation model in FIG. 5b, a target image to be processed is inputted into the target detection object segmentation model. First, the inputted target image is encoded and compressed by an encoder to obtain low-level semantic feature information with a low dimension, such as color and brightness. The encoder is connected to a decoder. The low-level semantic feature information outputted by the encoder is inputted into the decoder, and the decoder performs a decoding operation on the low-level semantic feature information to output a first target detection object prediction image with a size that is the same as the target image. Using an example in which the target image is the mammary tissue pathological image shown in FIG. 3, the mammary tissue pathological image is inputted into the target detection object segmentation model, and the target detection object segmentation model outputs the first target detection object prediction image shown in FIG. 5b. It can be learned from the first target detection object prediction image whether each pixel in the target image (the mammary tissue pathological image) pertains to the target detection object (the mammary duct). The first target detection object prediction image shows the region where the target detection object is located.

Figure 6:
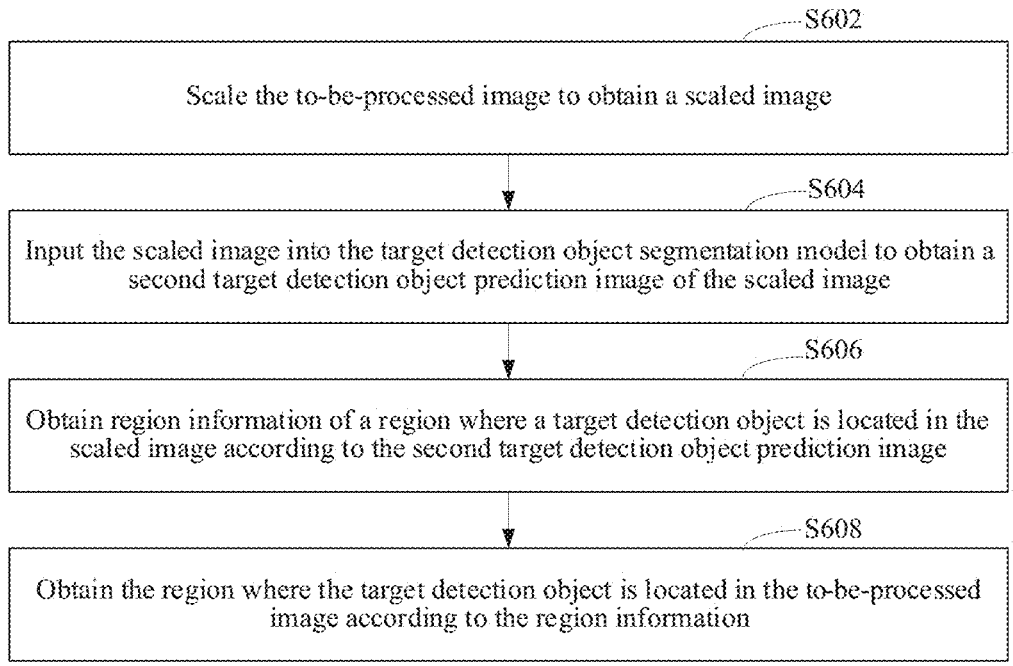
FIG. 6 is a schematic flowchart of an operation of obtaining a region where a target detection object is located in a target image to be processed according to an embodiment.

In an embodiment, as shown in FIG. 6, the operation of inputting the target image into a target detection object segmentation model to obtain a first target detection object prediction image corresponding to the target image, and obtaining a region where the target detection object is located in the target image according to the first target detection object prediction image includes the following operations:

Operation S602. Scale the target image to obtain a scaled image.

Operation S604. Input the scaled image into the target detection object segmentation model to obtain a second target detection object prediction image of the scaled image.

Operation S606. Obtain region information of a region where a target detection object is located in the scaled image according to the second target detection object prediction image.

Operation S608. Obtain the region where the target detection object is located in the target image according to the region information.

When an image data size of the target image is large, the target image may be scaled first to obtain a scaled image with a small image data size. It is to be understood that the scaled image and the target image are consistent in the image content, but are different in the image size and data size. The target image is scaled to obtain the corresponding scaled image, which can effectively reduce the amount of image data processing and speed up the segmentation of the target image.

The second target detection object prediction image refers to an image with a labeled region where the target detection object is located and with a size that is the same as the scaled image. After a scaled image is obtained, the scaled image is inputted into a target detection object segmentation model to obtain a second target detection object prediction image corresponding to the scaled image, and then a region where a target detection object is located is determined according to the second target detection object prediction image to obtain a region where the target detection object is located in the scaled image. After region information of the region where the target detection object is located in the scaled image is obtained, a region where the target detection object is located in the target image is correspondingly obtained.

Similarly, in an embodiment, the second target detection object prediction image may be a binary image.

It is to be understood that, after the scaled image is inputted into the target detection object segmentation model, a process of processing the scaled image by the target detection object segmentation model is the same as a process of processing the target image by the target detection object segmentation model.

Figure 7A:
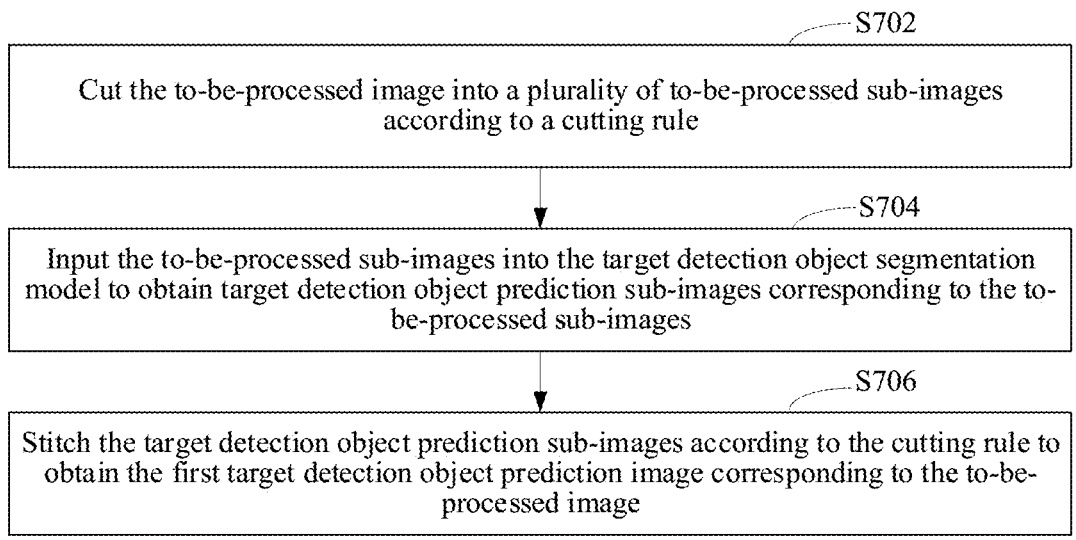
FIG. 7a is a schematic flowchart of an operation of obtaining a first target detection object prediction image according to another embodiment.

In an embodiment, as shown in FIG. 7a, the operation of inputting the target image into a target detection object segmentation model to obtain a first target detection object prediction image corresponding to the target image includes the following operations:

Operation S702. Cut the target image to be processed into a plurality of target sub-images to be processed (or referred to as to-be-processed sub-images) according to a cutting rule.

Operation S704. Input the target sub-images into the target detection object segmentation model to obtain target detection object prediction sub-images corresponding to the target sub-images.

Operation S706. Stitch the target detection object prediction sub-images according to the cutting rule to obtain the first target detection object prediction image corresponding to the target image.

When an image data size of the target image is large, the target image may be cut into a plurality of pieces to obtain a plurality of target sub-images. After the target image is cut, the plurality of target sub-images are inputted into the target detection object segmentation model, so that the images processed by the target detection object segmentation model are greatly reduced in the image size and data size, which can effectively reduce the amount of image data processing and speed up the segmentation of the image.

Specifically, after a target image is obtained, the target image is cut into a plurality of target sub-images according to a cutting rule; then the plurality of target sub-images are inputted one by one into a target detection object segmentation model to obtain a plurality of target detection object prediction sub-images corresponding to the plurality of target sub-images; and finally the plurality of target detection object prediction sub-images are stitched according to the cutting rule to obtain a first target detection object prediction image corresponding to the entire target image.

Figure 7B:
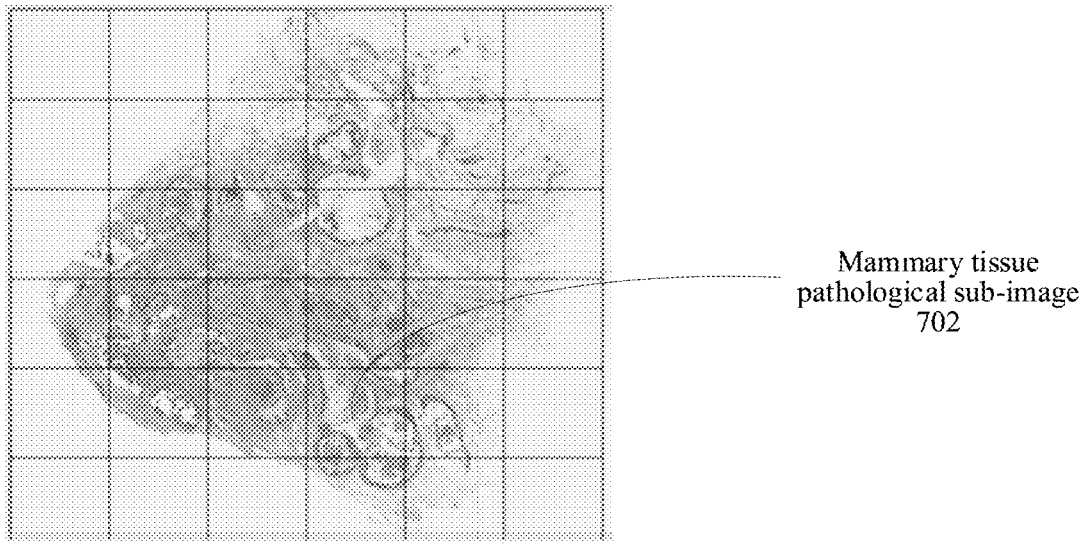
FIG. 7b is a schematic diagram of cutting a target image into a plurality of target sub-images according to an embodiment.
Figure 7C:
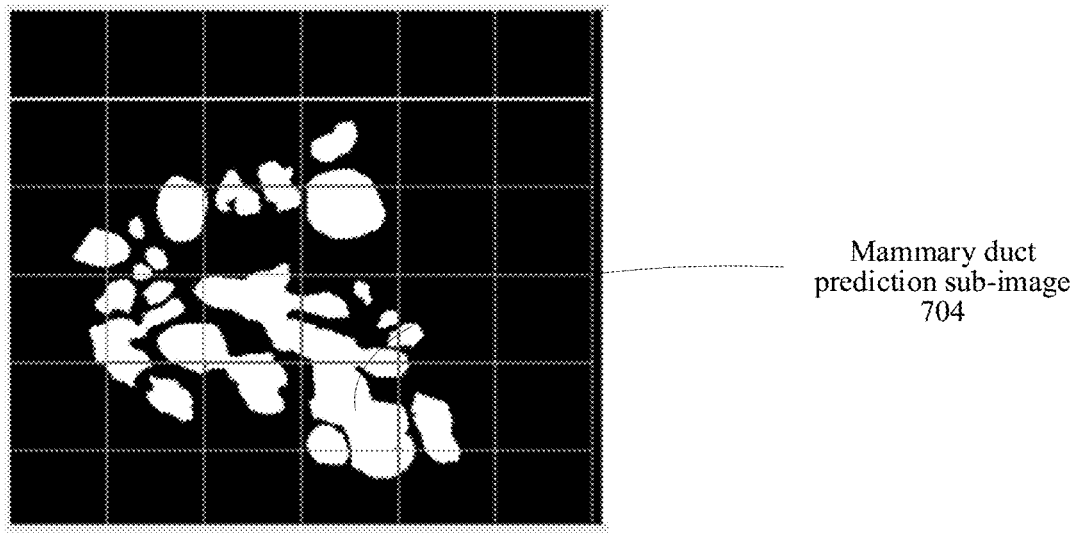
FIG. 7c is a schematic diagram of stitching target detection object prediction sub-images according to an embodiment.

Using an example in which the target image is the mammary tissue pathological image shown in FIG. 3, after the mammary tissue pathological image is obtained, the mammary tissue pathological image is cut according to a preset cutting rule. The cutting rule is shown in FIG. 7b. The mammary tissue pathological image is cut into 6*6 pieces of mammary tissue pathological sub-images. Then, the mammary tissue pathological sub-images are inputted one by one into the target detection object segmentation model to obtain mammary duct prediction sub-images corresponding to the mammary tissue pathological sub-images. For example, a mammary tissue pathological sub-image 702 in FIG. 7b is inputted into the target detection object segmentation model, and the target detection object segmentation model outputs a mammary duct prediction sub-image 704 in FIG. 7c. Finally, the mammary duct prediction sub-images are stitched according to the cutting rule to obtain a mammary duct prediction image of the entire mammary tissue pathological image, as shown in FIG. 7c.

It is to be understood that, after the target sub-images are inputted into the target detection object segmentation model, a process of processing the target sub-images by the target detection object segmentation model is the same as a process of processing the target image by the target detection object segmentation model.

Figure 8:
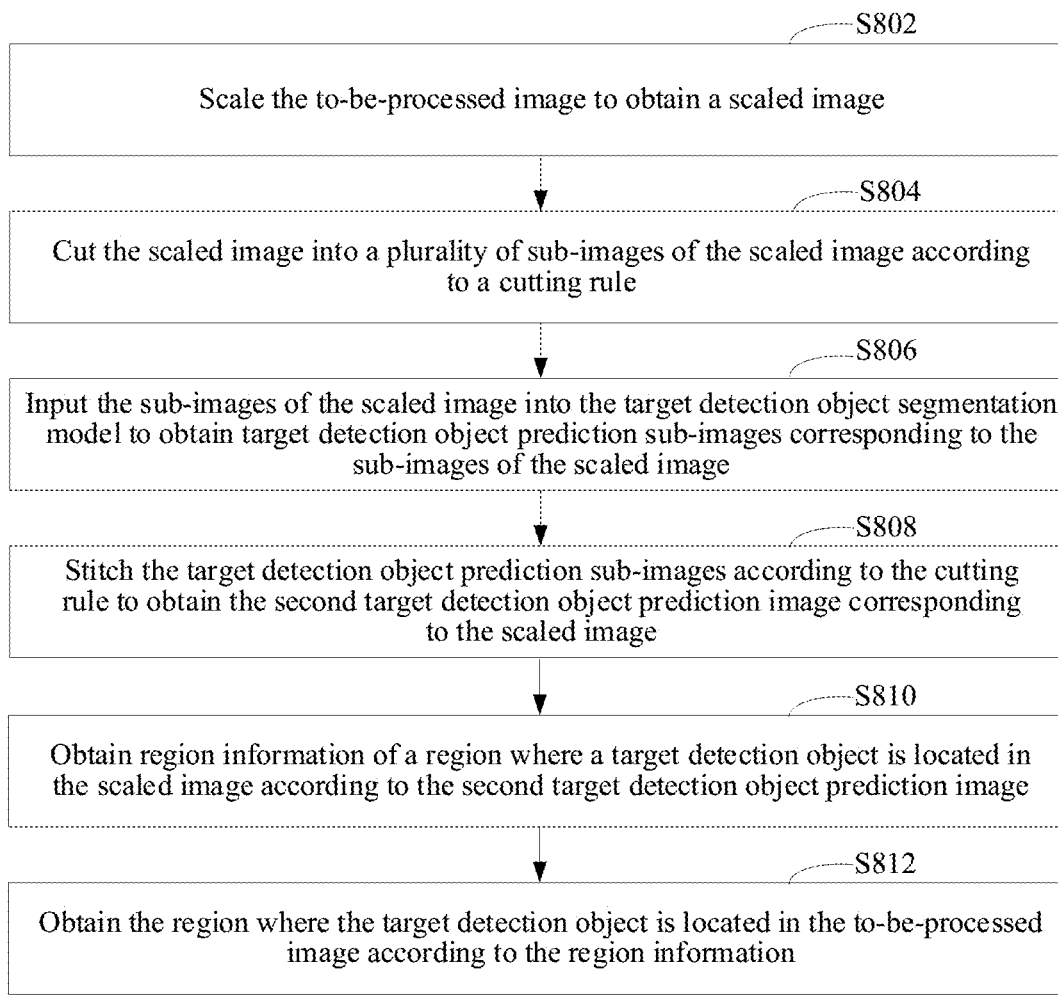
FIG. 8 is a schematic flowchart of an operation of obtaining a region where a target detection object is located in a target image according to another embodiment.

In an embodiment, as shown in FIG. 8, the operation of inputting the target image into a target detection object segmentation model to obtain a first target detection object prediction image corresponding to the target image, and obtaining a region where the target detection object is located in the target image according to the first target detection object prediction image includes the following operations:

Operation S802. Scale the target image to obtain a scaled image.

Operation S804. Cut the scaled image into a plurality of sub-images of the scaled image according to a cutting rule.

Operation S806. Input the sub-images of the scaled image into the target detection object segmentation model to obtain target detection object prediction sub-images corresponding to the sub-images of the scaled image.

Operation S808. Stitch the target detection object prediction sub-images according to the cutting rule to obtain the second target detection object prediction image corresponding to the scaled image.

Operation S810. Obtain region information of a region where a target detection object is located in the scaled image according to the second target detection object prediction image.

Operation S812. Obtain the region where the target detection object is located in the target image according to the region information.

When an image data size of the target image is large, the target image may be scaled first to obtain a scaled image; and then the scaled image may be cut into a plurality of pieces to obtain a plurality of sub-images of the scaled image. The scaling and cutting of target image reduce the image size and data size, which can effectively reduce the amount of image data processing and speed up the segmentation of the target image.

After a target image is obtained, the target image is scaled to obtain a scaled image, and the scaled image is cut according to a cutting rule to obtain a plurality of sub-images of the scaled image; then, the sub-images of the scaled image are inputted one by one into a target detection object segmentation model to obtain target detection object prediction sub-images corresponding to the sub-images of the scaled image; and then the target detection object prediction sub-images are stitched according to the cutting rule to obtain a second target detection object prediction image of the entire scaled image. Finally, a region where a target detection object is located is determined according to the second target detection object prediction image to obtain a region where the target detection object is located in the scaled image. After region information of the region where the target detection object is located in the scaled image is obtained, a region where the target detection object is located in the target image is obtained.

Figure 9A:
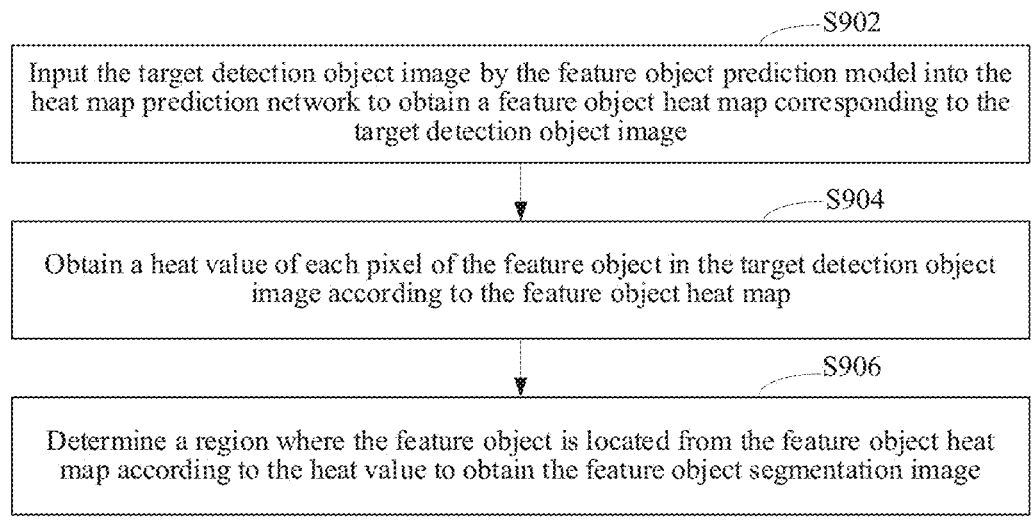
FIG. 9a is a schematic flowchart of an operation of obtaining a feature object segmentation image according to an embodiment.

In an embodiment, as shown in FIG. 9a, the feature object prediction model includes a heat map prediction network; and the operation of inputting the target detection object image into a feature object prediction model to obtain a feature object segmentation image of a feature object in the target detection object image includes the following operations:

Operation S902. Input the target detection object image into the heat map prediction network to obtain a feature object heat map corresponding to the target detection object image.

The heat map prediction network is a network model used to calculate a heat value of each pixel of the feature object in the target detection object image. The heat map prediction network herein is a trained network model directly used to calculate a heat value of each pixel of the feature object in the target detection object image. The heat value herein refers to a probability value that each pixel in the target detection object image pertains to the feature object. The heat map prediction network may include an FCN structure, a U-net structure, a Linknet structure, and the like.

The feature object heat map describes the heat value (that is, the probability value) of each pixel of the feature object in the target detection object image. Contour extraction may be performed according to the heat value of each pixel described in the feature object heat map to obtain a region where the feature object is located.

Operation S904. Obtain a heat value of each pixel of the feature object in the target detection object image according to the feature object heat map.

Operation S906. Determine a region where the feature object is located from the feature object heat map according to the heat value to obtain the feature object segmentation image.

After the feature object heat map is obtained, the heat value of each pixel of the feature object in the target detection object image may be obtained, and the contour extraction may be performed according to the heat value of each pixel to determine the region where the feature object is located, to obtain the feature object segmentation image.

Specifically, after the heat value of each pixel of the feature object is obtained from the feature object heat map, the contour extraction may be performed on the feature object heat map based on a watershed algorithm to determine the region where the feature object is located, to obtain the feature object segmentation image. The feature object segmentation image may be a binary image. After the contour extraction is performed on the feature object heat map based on the watershed algorithm to determine the region where the feature object is located, a pixel value of pixels in the region where the feature object is located in the feature object heat map may be set to 0 to achieve a visual display as white, and a pixel value of pixels in a region where no feature object is located in the target detection object image may be set to 255 to achieve a visual display as black.

Further, after the heat value of each pixel of the feature object is obtained from the feature object heat map, the feature object heat map may be directly binarized according to a preset heat value threshold to determine the region where the feature object is located, to obtain the feature object segmentation image. Specifically, a pixel value of pixels with a heat value greater than the preset heat value threshold may be set to 0 to achieve a visual display as white, and a pixel value of pixels with a heat value less than or equal to the preset heat value threshold may be set to 255 to achieve a visual display as black.

Figure 9B:
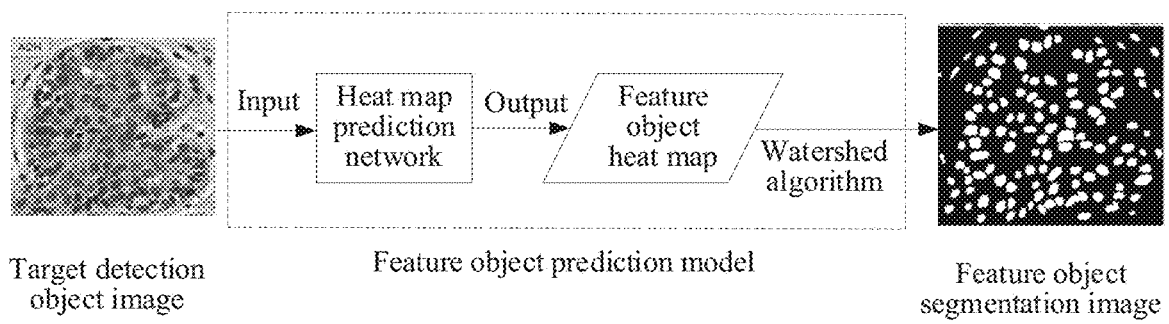
FIG. 9b is a principle frame diagram of a feature object prediction model according to an embodiment.
Figure 9C:
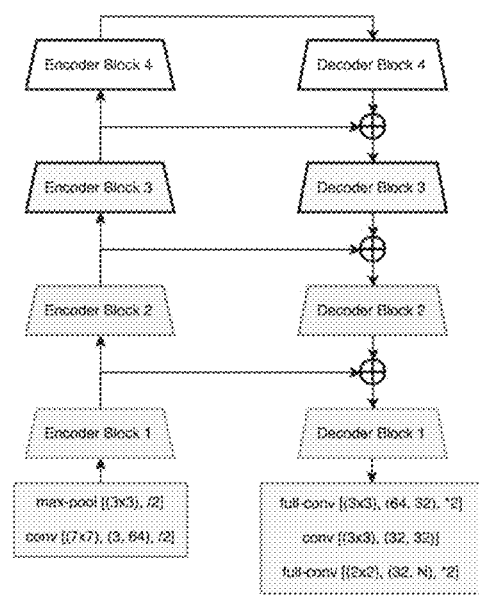
FIG. 9c is a schematic diagram of a network structure of a LinkNet network according to an embodiment.

In an embodiment, a feature object prediction model is shown in FIG. 9b. A heat map prediction network is a LinkNet structure, and the LinkNet structure is shown in FIG. 9c. In the LinkNet structure, each encoder block is connected to a decoder block. As shown in FIG. 9c, using an example in which a target detection object is a mammary duct, a target detection object image corresponding to the mammary duct is inputted into a target detection object segmentation model. First, the inputted target detection object image is encoded and compressed by an encoder block to obtain low-level semantic feature information with a low dimension, such as color and brightness. The encoder block is connected to a decoder block. The low-level semantic feature information outputted by the encoder block is inputted into the decoder block, and the decoder block performs a decoding operation on the low-level semantic feature information to output a feature object segmentation image with a size that is the same as the target detection object image. In the feature object segmentation image, a white region is a region where cells in the mammary duct are located, and a black region is a background or the interstitium of the mammary duct. In the LinkNet structure, an input of an encoder block is connected to an output of a corresponding decoder block. Before the decoder block outputs the feature object segmentation image, the encoder block may incorporate the low-level semantic feature information into the decoder block, so that the low-level semantic feature information and high-level semantic feature information are incorporated into the decoder block, which can effectively reduce the loss of spatial information during down-sampling. The decoder block shares parameters learned from each layer of the encoder block, which can effectively reduce the parameters of the decoder block.

Figure 10:
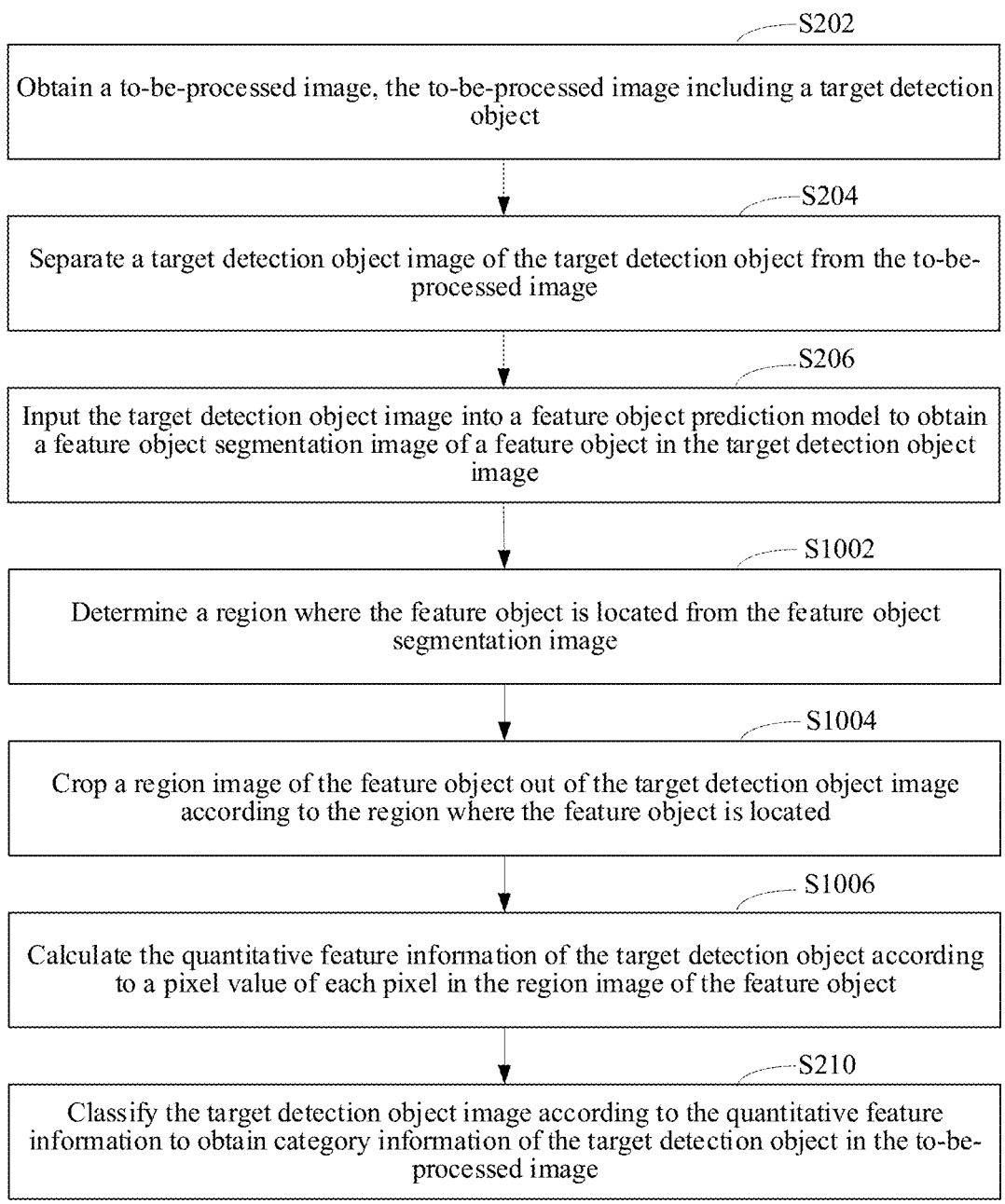
FIG. 10 is a schematic flowchart of an operation of obtaining quantitative feature information according to an embodiment.

In an embodiment, as shown in FIG. 10, the operation S208 of obtaining quantitative feature information of the target detection object according to the target detection object image and the feature object segmentation image includes the following operations:

Operation S1002. Determine a region where the feature object is located from the feature object segmentation image.

Operation S1004. Crop a region image of the feature object out of the target detection object image according to the region where the feature object is located.

The region image of the feature object refers to an image of the feature object cropped out of the target detection object image.

Operation S1006. Calculate the quantitative feature information of the target detection object according to a pixel value of each pixel in the region image of the feature object.

The quantitative feature information may be a color depth of the feature object. In a specific application, a pixel value of pixels in the region where the feature object is located may be used for quantification representation. For example, in a medical application scenario, assuming that a target detection object is a mammary duct, a feature object may be cells in the mammary duct. Feature information of the mammary duct includes a nuclear staining value. The nuclear staining value may be quantifiably represented by obtaining a pixel value of pixels in a region where the cells in the mammary duct are located.

Because the feature object segmentation image is usually a binary image, the pixel value of pixels in the region where the feature object is located obtained from the feature object segmentation image is difficult to characterize the color depth of the feature object. Therefore, after the feature object segmentation image is obtained, the region where the feature object is located may be determined from the feature object segmentation image, and then the region image of the region where the feature object is located is correspondingly cropped out of the target detection object image according to the region where the feature object is located in the feature object segmentation image; and then the pixel value of each pixel is obtained from the region image of the feature object to calculate the quantitative feature of the target detection object. Calculating the quantitative feature information of the target detection object according to the pixel value of each pixel in the region image of the feature object may specifically include calculating an average value of pixel values of all pixels in the region image and determining the average value as the quantitative feature information of the target detection object.

Figure 11:
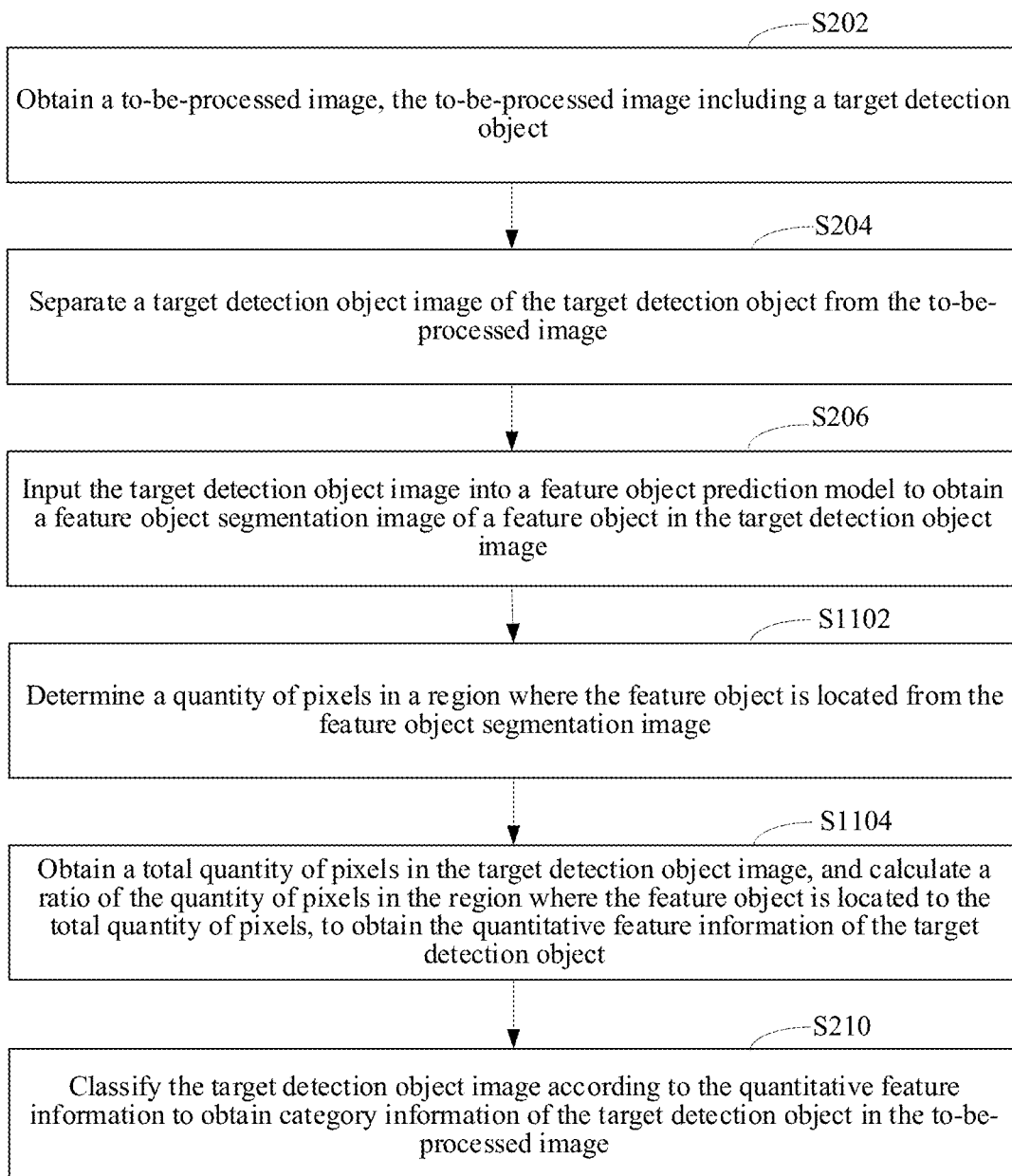
FIG. 11 is a schematic flowchart of an operation of obtaining quantitative feature information according to another embodiment.

In an embodiment, as shown in FIG. 11, the operation S208 of obtaining quantitative feature information of the target detection object according to the target detection object image and the feature object segmentation image includes the following operations:

Operation S1102. Determine a quantity of pixels in a region where the feature object is located from the feature object segmentation image.

Operation S1104. Obtain a total quantity of pixels in the target detection object image, and calculate a ratio of the quantity of pixels in the region where the feature object is located to the total quantity of pixels, to obtain the quantitative feature information of the target detection object.

The quantitative feature information may be a shape and size of the feature object. In a specific application, a quantity of pixels in the region where the feature object is located may be used for quantification representation. For example, in a medical application scenario, assuming that a target detection object is a mammary duct, a feature object may be cells in the mammary duct. Feature information of the mammary duct includes a nuclear size. The nuclear size may be quantifiably represented by obtaining a quantity of pixels in a region where the cells in the mammary duct are located. It may be understood that, in an image, a quantity of pixels may be equivalent to an area covered by the pixels in the image.

Specifically, after the feature object segmentation image is obtained, the region where the feature object is located may be determined according to the feature object segmentation image, and the quantity of pixels in the region where the feature object is located may be calculated; and finally, the total quantity of pixels in the target detection object image or the feature object segmentation image is counted, and the ratio of the quantity of pixels in the region where the feature object is located to the total quantity of pixels, to determine the quantitative feature of the target detection object.

Further, in an embodiment, a method for obtaining quantitative feature information also includes: determining a region where a feature object is located and an area value of the region where the feature object is located from a feature object segmentation image, performing contour extraction on the region where the feature object is located, calculating a perimeter of a contour of the region where the feature object is located, the perimeter of the contour of the region where the feature object is located being represented by a quantity of pixels of the contour of the region where the feature object is located to calculate an area value of a pure circle with an equal perimeter, and obtaining a ratio of the area value of the pure circle with the equal perimeter to the area value of the region where the feature object is located, to obtain the quantitative feature information of the feature object in circularity.

Figure 12:
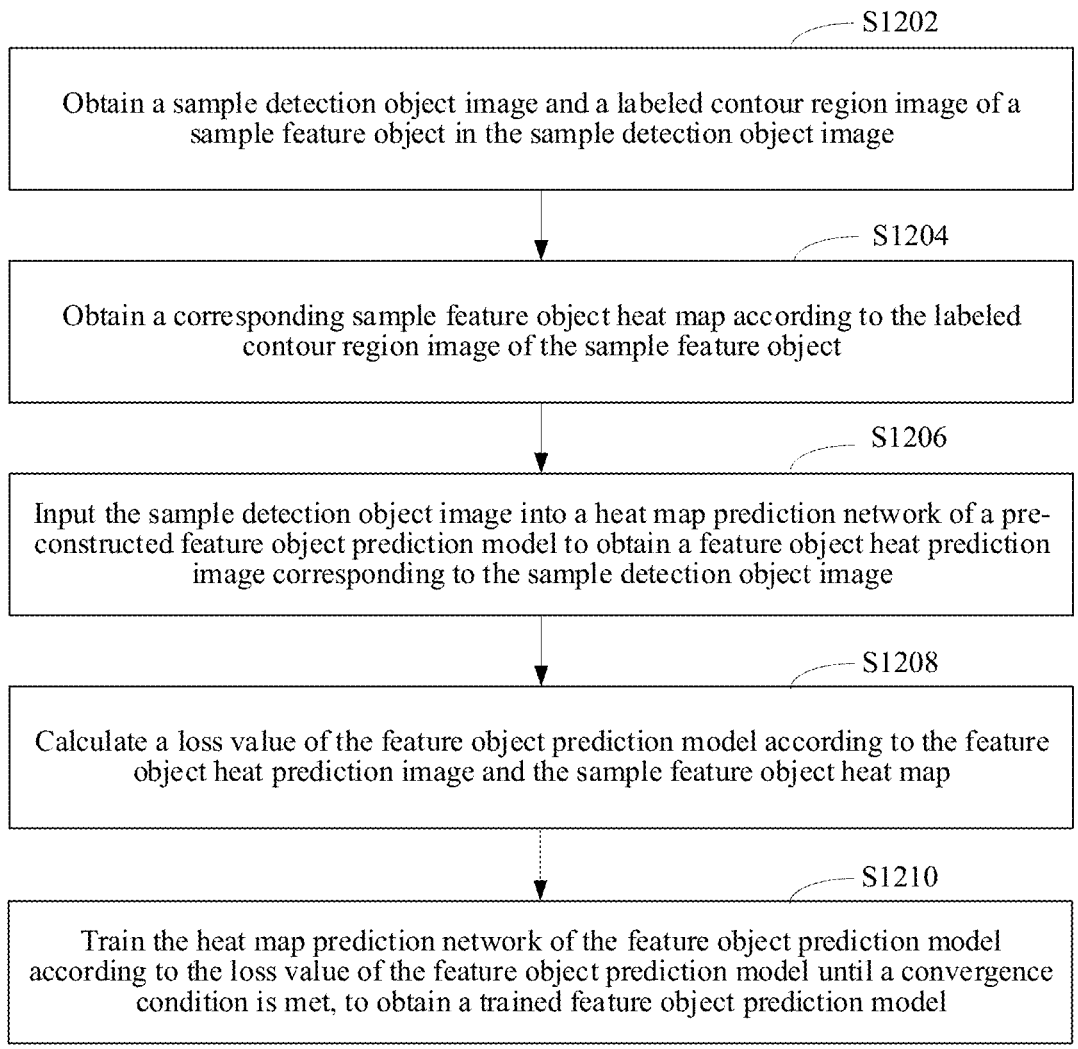
FIG. 12 is a schematic flowchart of an operation of training a feature object prediction model according to an embodiment.

In an embodiment, as shown in FIG. 12, the operation of training the feature object prediction model includes the following operations:

Operation S1202. Obtain a sample detection object image and a labeled contour region image of a sample feature object in the sample detection object image.

The sample detection object image is an image used to train the feature object prediction model. The sample detection object image includes a plurality of sample feature objects. The labeled contour region image of the sample feature object in the sample detection object image means that a region where the sample feature object is located is labeled, and is in one-to-one correspondence to the sample detection object image. Further, the labeled contour region image of the sample feature object may be labeled by a professional data labeler, or may be a public sample detection object data set. In a medical application scenario, the sample detection object image may be an image of a single body tissue, and the labeled contour region image of the sample feature object may be an image with a region labeled where cells (or nuclei) are located.

Operation S1204. Obtain a corresponding sample feature object heat map according to the labeled contour region image of the sample feature object.

After the labeled contour region image of the sample feature object is obtained, the labeled contour region image of the sample feature object is converted into the sample feature object heat map. The sample feature object heat map describes a probability value that each pixel in the sample detection object image pertains to the sample feature object. The sample feature object heat map herein may be understood as a standard heat map that accurately describes a probability value that each pixel in the sample detection object image pertains to the sample feature object.

Specifically, obtaining a corresponding sample feature object heat map according to the labeled contour region image of the sample feature object may include determining a probability value of pixels of the region where the sample feature object is located in the labeled contour region image of the sample feature object as 1, and determining a probability value of pixels of a region where no sample feature object is located in the labeled contour region image of the sample feature object as 0; or may include determining a center pixel of the region where the sample feature object is located in the labeled contour region image of the sample feature object and setting a probability value of the center pixel to 1, and setting a probability value of contour pixels of the contour of the sample feature object to a predetermined value, for example, 0.5, and then setting a probability value of each pixel between the center pixel and the contour pixels in the region where the sample feature object is located by interpolation. It may be understood that a probability value of a pixel in the region where the sample feature object is located gradually decreases starting from the center pixel to a contour pixel, with the probability value of the predetermined value, of the contour of the sample feature object.

Operation S1206. Input the sample detection object image into a heat map prediction network of a pre-constructed feature object prediction model to obtain a feature object heat prediction image corresponding to the sample detection object image.

The obtained sample detection object image is inputted into the heat map prediction network of the feature object prediction model. A network structure of the heat map prediction network includes, but is not limited to, an encoder and a decoder. By using the heat map prediction network, the sample detection object image is encoded and compressed by the encoder, low-level semantic feature information with a low dimension is extracted from the sample detection object image, the extracted low-level semantic feature information is subjected to a decoding operation performed by the decoder, and the probability value that each pixel in the sample detection object image pertains to the feature object is calculated, to obtain the feature object heat prediction image. The feature object heat prediction image describes a probability value that each pixel in the sample detection object image pertains to the sample feature object.

Operation S1208. Calculate a loss value of the feature object prediction model according to the feature object heat prediction image and the sample feature object heat map.

Operation S1210. Train the heat map prediction network of the feature object prediction model according to the loss value of the feature object prediction model until a convergence condition is met, to obtain a trained feature object prediction model.

Specifically, the feature object heat prediction image describes a probability value that each pixel in the sample detection object image pertains to the sample feature object, and the sample feature object heat map also describes a probability value that each pixel pertains to the feature object, and it is considered that the probability value labeled in the sample feature object heat map accurately describes a probability that each pixel in the sample detection object image pertains to the sample feature object. Therefore, the loss value may be calculated according to the probability value that each pixel pertains to the target detection object in the feature object heat prediction image and the probability value of each pixel in the sample feature object heat map. In an example, a distance value between the feature object heat prediction image and the sample feature object heat map may be calculated according to the probability value that each pixel pertains to the target detection object in the feature object heat prediction image and the probability value of each pixel in the sample feature object heat map, and the distance value is determined as the loss value. In another example, the loss value may be calculated by using the softmax function according to the probability value that each pixel pertains to the target detection object in the feature object heat prediction image and the probability value of each pixel in the sample feature object heat map.

Further, after the loss value of the feature object prediction model is calculated, the heat map prediction network of the feature object prediction model is trained according to the loss value, and network parameters of the heat map prediction network of the feature object prediction model are adjusted until the convergence condition is met, to obtain the trained feature object prediction model. The convergence condition may be set or adjusted according to actual requirements. For example, when the loss value of the training reaches the minimum, it can be considered that the convergence condition is met; or when the loss value can no longer change, it can be considered that the convergence condition is met.

Specifically, in a medical application scenario, after the feature object prediction model is trained based on a public sample detection object data set (multi-organ nucleus segmentation challenge), an accuracy of the segmentation of cells by the feature object prediction model may reach 0.6632.

Figure 13:
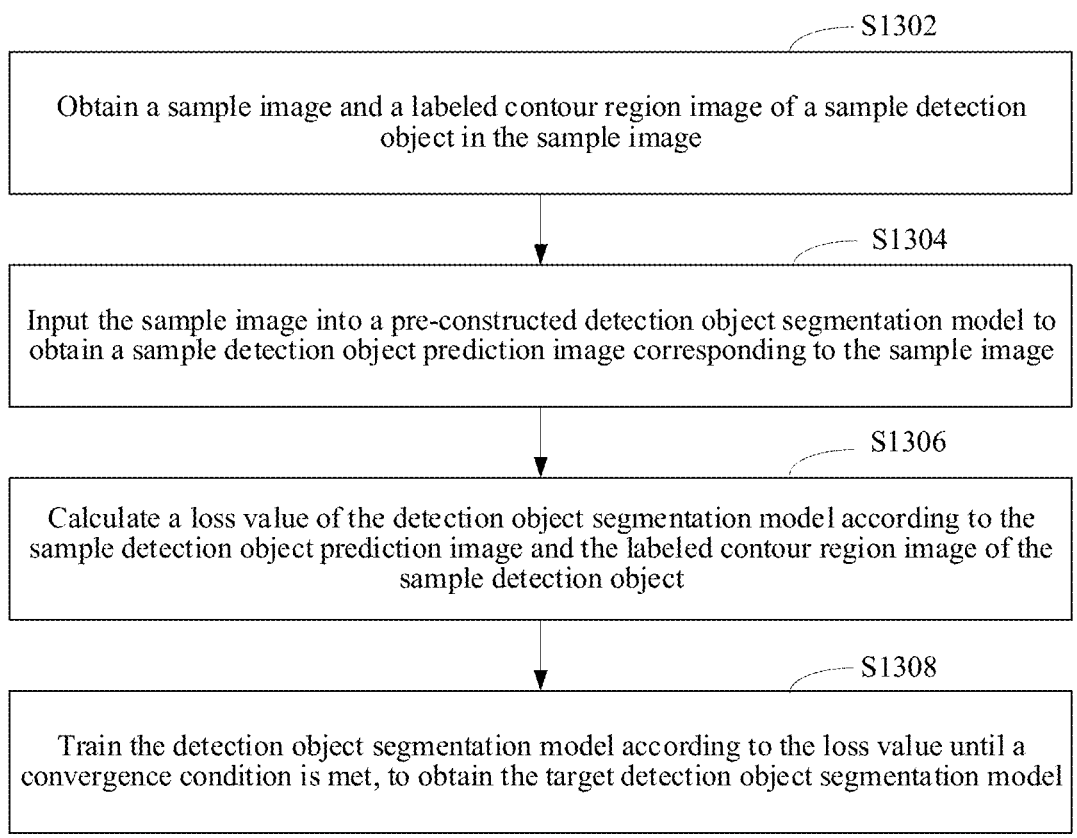
FIG. 13 is a schematic flowchart of an operation of training a target detection object segmentation model according to an embodiment.

In an embodiment, as shown in FIG. 13, the operation of training the target detection object segmentation model includes the following operations:

Operation S1302. Obtain a sample image and a labeled contour region image of a sample detection object in the sample image.

The feature object prediction model and the target detection object segmentation model are trained separately. The process of training the target detection object segmentation model may specifically include first obtaining the sample image and the labeled contour region image of the sample detection object in the sample image. The sample image is an image used to train the target detection object segmentation model. The sample image includes one or more sample detection objects. The labeled contour region image of the sample detection object refers to a binary image with a labeled region where the sample detection object is located, and is in one-to-one correspondence to the sample image. Further, the labeled contour region image of the sample detection object may be labeled by a professional data labeler.

In an embodiment, in a medical application scenario, the sample image may be a complete pathological slice image, the sample detection object may be body organs, tissues, cells, or the like, and the labeled contour region image of the sample detection object in the sample image may be an image with a contour position of a region labeled where the sample detection object (for example, the body tissues) is located. For example, the sample image may be a mammary tissue pathological image, and the labeled contour region image may be a mammary tissue pathological image with a contour position of a region labeled where a mammary duct is located.

Operation S1304. Input the sample image into a pre-constructed detection object segmentation model to obtain a sample detection object prediction image corresponding to the sample image.

After the sample image and the labeled contour region image of the sample detection object corresponding to the sample image are obtained, the obtained sample image is inputted into the detection object segmentation model. A network structure of the detection object segmentation model includes, but is not limited to, an encoder and a decoder. By using the detection object segmentation model, the sample image is encoded and compressed by the encoder, low-level semantic feature information with a low dimension is extracted from the sample image, the extracted low-level semantic feature information is subjected to a decoding operation performed by the decoder, and a probability value that each pixel in the sample image pertains to the sample detection object is calculated to determine whether each pixel pertains to the sample detection object according to the probability value, to obtain the sample detection object prediction image. The sample detection object prediction image intuitively describes whether each pixel in the sample image pertains to the sample detection object, and shows the region where the sample detection object is located.

Operation S1306. Calculate a loss value of the detection object segmentation model according to the sample detection object prediction image and the labeled contour region image of the sample detection object.

The sample detection object prediction image describes the region where the sample detection object is located, and the labeled contour region image of the sample detection object labels the region where the sample detection object is located. Therefore, the loss value of the detection object segmentation model may be specifically obtained by calculating a difference between region information (for example, region position coordinates) of the region where the sample detection object is located obtained from the sample detection object prediction image and region information (for example, region position coordinates) of the region where the sample detection object is located obtained from the labeled contour region image of the sample detection object.

Further, to strengthen the edge response to the target detection object, edge information of the sample detection object may be constructed to calculate the loss value. That is, the loss value of the detection object segmentation model may be obtained by calculating a difference between contour information (for example, contour position coordinates) of the region where the sample detection object is located obtained from the sample detection object prediction image and contour information (for example, contour position coordinates) of the region where the sample detection object is located obtained from the labeled contour region image of the sample detection object.

Further, region information and contour information of the region where the sample detection object is located in the sample detection object prediction image and region information and contour information of the region where the sample detection object is located in the labeled contour region image of the sample detection object may be first obtained, a difference between the two pieces of region information and a difference between the two pieces of contour information are then calculated, and a sum of the difference of the region information and the difference of the contour information is determined as the loss value of the detection object segmentation model.

Further, the sample detection object prediction image describes the probability value that each pixel in the sample image pertains to the sample detection object, and the labeled contour region image of the sample detection object labels that 100% of each pixel in the region where the sample detection object is located pertains to the sample detection object. A probability value of each pixel in the labeled region where the sample detection object is located may be determined as 1, and a probability value of each pixel in a labeled region where no sample detection object is located may be determined as 0. Therefore, the loss value of the training may be calculated according to the probability value that each pixel pertains to the target detection object in the sample detection object prediction image and the probability value of each pixel in the labeled contour region image of the sample detection object.

Operation S1308. Train the detection object segmentation model according to the loss value until a convergence condition is met, to obtain the target detection object segmentation model.

After the loss value of the detection object segmentation model is calculated, the detection object segmentation model is trained according to the loss value, and model parameters of the detection object segmentation model are adjusted until the convergence condition is met, to obtain the target detection object model. The convergence condition may be set or adjusted according to actual requirements. For example, when the loss value reaches the minimum, it can be considered that the convergence condition is met; or when the loss value can no longer change, it can be considered that the convergence condition is met.

Figure 14:
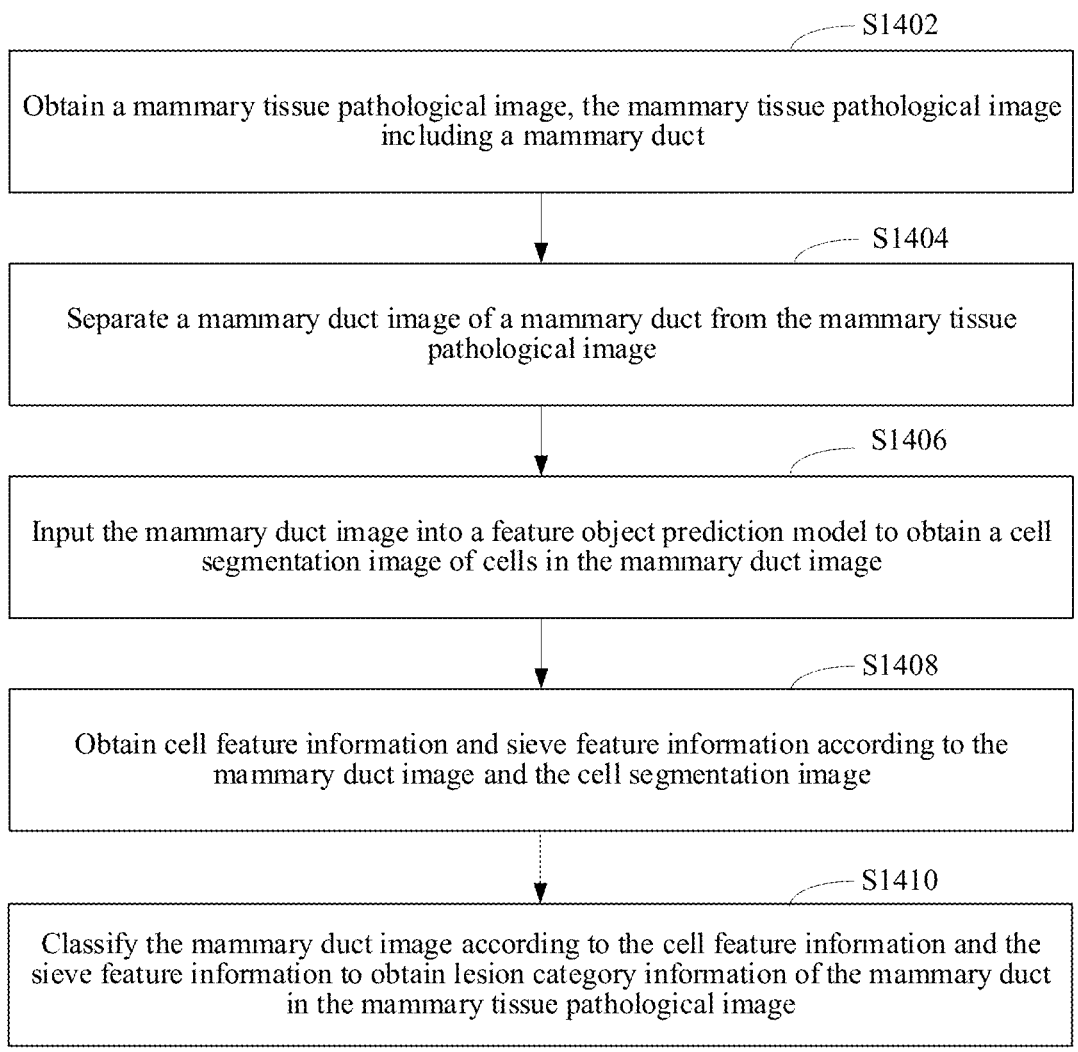
FIG. 14 is a schematic flowchart of an AI-based object classification method according to another embodiment.

In an embodiment, as shown in FIG. 14, an AI-based object classification method is provided, including the following operations:

Operation S1402. Obtain a mammary tissue pathological image, the mammary tissue pathological image including a mammary duct.

The mammary tissue pathological image refers to an image taken by a medical imaging device, which may be a WSI. The medical imaging device includes, but is not limited to, a digital pathological slide scanner, a digital slide microscope, and the like. In a specific application scenario, a position where a target detection object is specifically located may be obtained from the mammary tissue pathological image. In an actual application scenario, the target detection object in the mammary tissue pathological image may be, but is not limited to, the mammary duct.

Operation S1404. Separate a mammary duct image of the mammary duct from the mammary tissue pathological image.

After the mammary tissue pathological image is obtained, a region image of a region where the mammary duct is located may be separated from the mammary tissue pathological image. The region image is the mammary duct image.

Specifically, separating a mammary duct image of the mammary duct from the mammary tissue pathological image may include inputting the mammary tissue pathological image into a DL model for image segmentation, predicting a region where the mammary duct is located by using the DL model, and then cropping a region image of the region where the mammary duct is located from the mammary tissue pathological image according to the predicted region where the mammary duct is located as the target detection object image of the target detection object.

Further, in an actual application scenario, the mammary tissue pathological image is usually a digital pathological slide image obtained at 40× or 20× magnification, which has a huge data size. To reduce the data size for processing and increase the data processing rate, the mammary tissue pathological image obtained at 40× or 20× magnification may be scaled to a mammary tissue pathological image at 10× or 5× magnification, and the region where the mammary duct is located may be obtained from the mammary tissue pathological image at 10× or 5× magnification, so that the region image of the region where the mammary duct is located is correspondingly cut out of the mammary tissue pathological image at 40× or 20× magnification to be used as the target detection object image of the target detection object.

Further, the mammary tissue pathological image may be cut into a plurality of mammary tissue pathological sub-images according to a preset cutting rule, then a region where the mammary duct is located is obtained from each mammary tissue pathological sub-image, and finally results of the region where the mammary duct is located in each mammary tissue pathological sub-image are stitched according to the cutting rule to obtain a result of the region where the mammary duct is located in the entire mammary tissue pathological image. For example, as shown in FIG. 7b and FIG. 7c, after the mammary tissue pathological image is obtained, the mammary tissue pathological image is cut according to the preset cutting rule shown in FIG. 7b to obtain 6*6 pieces of mammary tissue pathological sub-images. Then, for each mammary tissue pathological sub-image, the mammary tissue pathological sub-images are inputted one by one into the target detection object segmentation model to obtain mammary duct prediction sub-images corresponding to the mammary tissue pathological sub-images. For example, a mammary tissue pathological sub-image 702 in FIG. 7b is inputted into the target detection object segmentation model, and the target detection object segmentation model outputs a mammary duct prediction sub-image 704 in FIG. 7c. After the mammary duct prediction sub-images corresponding to the mammary tissue pathological sub-images are obtained, the mammary duct prediction sub-images are stitched according to the cutting rule to obtain a mammary duct prediction image of the entire mammary tissue pathological image. The mammary duct prediction image is shown in FIG. 7c.

Operation S1406. Input the mammary duct image into a feature object prediction model to obtain a cell segmentation image of cells in the mammary duct image.

The cell segmentation image refers to an image with a labeled region where the cells are located and with a size that is the same as the mammary duct image. In an embodiment, the cell segmentation image may be a binary image, that is, the cell segmentation image shows a visual effect of only black and white. For example, in the cell segmentation image, from the mammary duct image, a region where cells are located may be displayed as white, and a region where no cells are located may be displayed as black.

The feature object prediction model is a network model used to determine whether each pixel in the mammary duct image pertains to the cells to output the cell segmentation image. The feature object prediction model herein is a trained network model directly used to determine whether each pixel in the mammary duct image pertains to the cells to output the cell segmentation image. The feature object prediction model may include an FCN structure, a U-net structure, and the like. This is not limited herein. Specifically, the feature object prediction model includes, but is not limited to, an encoder and a decoder. The encoder is used to encode and compress the mammary duct image, and extract a low-level semantic feature image with a lower dimension. The decoder is used to perform a decoding operation on the low-level semantic feature image outputted by the encoder, and output the cell segmentation image with a size that is the same as the mammary duct image.

Further, in an embodiment, the feature object prediction model may include a heat map prediction network. The mammary duct image is inputted into the heat map prediction network to obtain a cell heat map corresponding to the mammary duct image, then a heat value of each pixel of the cells is obtained from the mammary duct image according to the cell heat map, and finally a region where the cells are located is determined from the cell heat map according to the heat value of each pixel of the cells in the mammary duct image to obtain the cell segmentation image. Specifically, as shown in FIG. 9b, the mammary duct image is inputted into the feature object prediction model as the target detection object image. First, a feature object heat map, that is, the cell heat map, with a size that is the same as the mammary duct image is outputted through the heat map prediction network, a heat value of each pixel of the cells in the mammary duct image being labeled on each corresponding pixel in the cell heat map; and then, contour extraction may be performed on the cell heat map based on a watershed algorithm according to the heat value of each pixel in the cell heat map to determine the region where the cells are located, to obtain the cell segmentation image. The heat map prediction network is a LinkNet structure. In the LinkNet structure, each encoder block is connected to a decoder block. Further, after the region where the cells are located is obtained according to the heat value, a pixel value of pixels in the region where the cells are located in the cell heat map may be set to 0 to achieve a visual display as white, and a pixel value of pixels in a region where no cells are located in the cell heat map may be set to 255 to achieve a visual display as black.

Operation S1408. Obtain cell feature information and sieve feature information according to the mammary duct image and the cell segmentation image.

The cell feature information and the sieve feature information refer to information about quantified features of the cells in the mammary duct, for example, the cell feature information includes, but is not limited to, a cell quantity, a cell size, a cell circularity, and a nuclear staining value in the mammary duct, and the sieve feature information includes, but is not limited to, a sieve size and a cytoplasmic staining value in the mammary duct.

After the mammary duct image and the cell segmentation image corresponding to the mammary duct image are obtained, the cell feature information and the sieve feature information of the cells in the mammary duct may be calculated according to image data of the mammary duct image and the cell segmentation image.

Specifically, a region where the cells are located may be obtained from the cell segmentation image, a region corresponding to the region where the cells are located may be determined from the mammary duct image, an image of the region may be determined as a region image of the cells, and finally the cell feature information for representing the nuclear staining value and the sieve feature information for representing the cytoplasmic staining value may be calculated according to information of pixels in the region image of the cells. Alternatively, a quantity of pixels in the region where the cells are located may be determined from the cell segmentation image, a total quantity of pixels in the mammary duct image is then obtained, and a ratio of the quantity of pixels in the region where the cells are located to the total quantity of pixels is calculated, to obtain the cell feature information for representing the cell size and the sieve feature information for representing the sieve size.

Further, a method for obtaining cell feature information also includes: determining a region where cells are located and an area value of the region where the cells are located from a cell segmentation image, performing contour extraction on the region where the cells are located, calculating a length of pixels of a contour of the region where the cells are located to obtain a perimeter of the contour of the region where the cells are located, and calculating a ratio of an area value of a pure circle with an equal perimeter to the area value of the region where the cells are located to obtain a circularity, to obtain the cell feature information of the cells in circularity.

Operation S1410. Classify the mammary duct image according to the cell feature information and the sieve feature information to obtain lesion category information of the mammary duct in the mammary tissue pathological image.

After the cell feature information and the sieve feature information are obtained, the mammary duct image may be classified according to the cell feature information and the sieve feature information of the mammary duct image to obtain the lesion category information of the mammary duct in the mammary tissue pathological image.

Specifically, classifying the mammary duct image according to the cell feature information and the sieve feature information may include inputting the cell feature information and the sieve feature information of the mammary duct image into a trained classifier, and classifying the mammary duct image by using the classifier. The classifier may be an ML-based classifier, for example, an SVM classifier, or may be a DL-based classifier, for example, a CNN-based classifier.

Further, in an embodiment, the training of the classifier may specifically include obtaining a sample mammary duct image and a standard lesion category label corresponding to the sample mammary duct image, inputting the sample mammary duct image into a pre-constructed classifier to obtain a predicted lesion category label corresponding to the sample mammary duct image, then calculating a loss value of the classifier by comparing the standard lesion category label with the predicted lesion category label of the sample mammary duct image, and finally adjusting parameters of the classifier according to the loss value of the classifier to obtain a trained classifier.

In an embodiment, separating a mammary duct image of the mammary duct from the mammary tissue pathological image may specifically include first inputting the mammary tissue pathological image into a target detection object segmentation model to obtain a mammary duct prediction image corresponding to the mammary tissue pathological image, then obtaining a region where the mammary duct is located in the mammary tissue pathological image according to the mammary duct prediction image, and finally segmenting the mammary tissue pathological image according to the region where the mammary duct is located to obtain the mammary duct image. The target detection object segmentation model is a network model used to determine whether each pixel in the mammary tissue pathological image pertains to the mammary duct to output the mammary duct prediction image. The feature object segmentation model is a trained network model. Specifically, as shown in FIG. 5b, the target detection object segmentation model includes, but is not limited to, an encoder and a decoder. The encoder is used to encode and compress the mammary tissue pathological image, and extract a low-level semantic feature image with a lower dimension. The decoder is used to perform a decoding operation on the low-level semantic feature image outputted by the encoder, and output the mammary duct prediction image with a size that is the same as the mammary tissue pathological image.

Further, in an embodiment, the mammary duct prediction image may be a binary image, that is, the mammary duct prediction image shows a visual effect of only black and white. For example, in the mammary duct prediction image, a region where the mammary duct is located may be displayed as white, and a region where no mammary duct is located (such as the background or interstitium) may be displayed as black. Specifically, inputting the mammary tissue pathological image into the target detection object segmentation model to obtain the mammary duct prediction image corresponding to the mammary tissue pathological image may include calculating a probability value that each pixel in the mammary tissue pathological image pertains to the mammary duct by using the target detection object segmentation model, classifying the pixels in the mammary tissue pathological image according to the probability value to obtain pixels that pertain to the mammary duct and pixels that do not pertain to the mammary duct, and then setting a grayscale value of the pixels that pertain to the mammary duct to 0, and setting a grayscale value of the pixels that do not pertain to the mammary duct to 255, to obtain the mammary duct prediction image in which the region where the mammary duct is located may be displayed as white, and the region where no mammary duct is located may be displayed as black.

Figure 15:
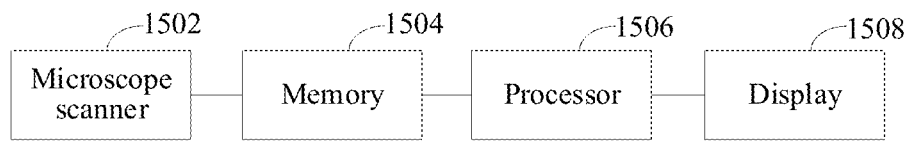
FIG. 15 is a structural block diagram of a medical imaging device according to an embodiment.

In an embodiment, as shown in FIG. 15, a medical imaging device is provided, including:
- a microscope scanner 1502, configured to obtain a mammary tissue pathological image;
- a memory 1504, storing a computer-readable instruction;
- a processor 1506, the computer-readable instruction, when executed by the processor, causing the processor to perform the following operations: separating a mammary duct image of a mammary duct from the mammary tissue pathological image; inputting the mammary duct image into a feature object prediction model to obtain a cell segmentation image of cells in the mammary duct image; obtaining cell feature information and sieve feature information according to the mammary duct image and the cell segmentation image; and classifying the mammary duct image according to the cell feature information and the sieve feature information to obtain lesion category information of the mammary duct in the mammary tissue pathological image; and
- a display 1508, configured to display the mammary tissue pathological image and the lesion category information of the mammary duct in the mammary tissue pathological image.

Specifically, the medical imaging device may include the microscope scanner 1502, the memory 1504, the processor 1506, and the display 1508. The microscope scanner 1502 transmits an acquired mammary tissue pathological image to the memory 1504. The memory stores a computer-readable instruction. The computer-readable instruction, when executed by the processor 1506, causes the processor 1506 to perform the following operations: separating a mammary duct image of a mammary duct from the mammary tissue pathological image; inputting the mammary duct image into a feature object prediction model to obtain a cell segmentation image of cells in the mammary duct image; obtaining cell feature information and sieve feature information according to the mammary duct image and the cell segmentation image; and classifying the mammary duct image according to the cell feature information and the sieve feature information to obtain lesion category information of the mammary duct in the mammary tissue pathological image. Finally, the mammary tissue pathological image and the lesion category information of the mammary duct in the mammary tissue pathological image may be displayed on the display 1508. That is, the region where the mammary duct is located and the lesion category information of the mammary duct that are labeled in the mammary tissue pathological image are displayed on the display 1508.

It is to be understood that operations, or steps, in the foregoing flowchart are displayed in sequence based on indication of arrows, but the operations are not necessarily performed in sequence based on a sequence indicated by the arrows. Unless clearly specified in this specification, there is no strict sequence limitation on the execution of the operations, and the operations may be performed in another sequence. In addition, at least some of the steps in the foregoing may include a plurality of sub-operations or a plurality of stages. These sub-operations or stages are not necessarily completed at the same moment, but may be performed at different moments. Besides, these sub-operations or stages may not be necessarily performed sequentially, but may be performed in turn or alternately with other operations or at least some of sub-operations or stages of other operations.

Figure 16:
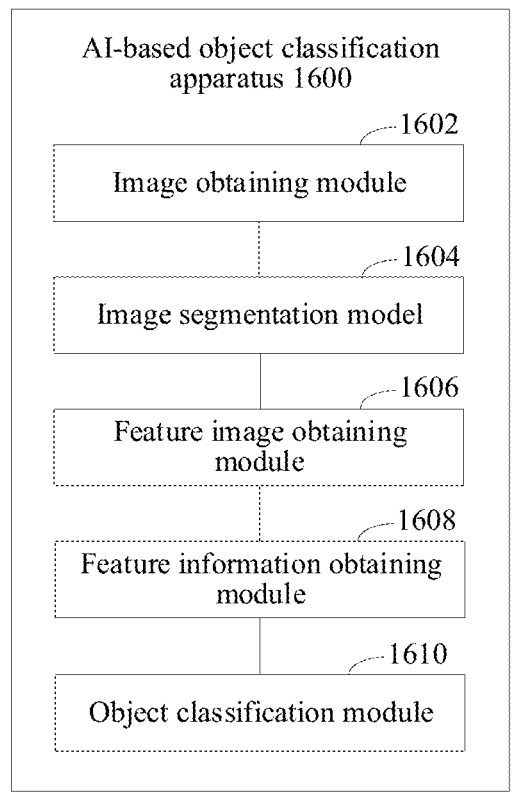
FIG. 16 is a structural block diagram of an AI-based object classification apparatus according to an embodiment.

In an embodiment, as shown in FIG. 16, an AI-based object classification apparatus 1600 is provided, including:

an image obtaining module 1602, configured to obtain a target image, the target image including a target detection object;

an image segmentation module 1604, configured to separate a target detection object image of the target detection object from the target image;

a feature image obtaining module 1606, configured to input the target detection object image into a feature object prediction model to obtain a feature object segmentation image of a feature object in the target detection object image;

a feature information obtaining module 1608, configured to obtain quantitative feature information of the target detection object according to the target detection object image and the feature object segmentation image; and an object classification module 1610, configured to classify the target detection object image according to the quantitative feature information to obtain category information of the target detection object in the target image.

In an embodiment, the image segmentation module includes:

an object region determining unit, configured to input the target image into a target detection object segmentation model to obtain a first target detection object prediction image corresponding to the target image, and obtain a region where the target detection object is located in the target image according to the first target detection object prediction image; and an object region segmentation unit, configured to segment the target image according to the region where the target detection object is located to obtain the target detection object image.

In an embodiment, the image segmentation module also includes an image scaling unit;

the image scaling unit, configured to scale the target image to obtain a scaled image; and the object region determining unit, configured to input the scaled image into the target detection object segmentation model to obtain a second target detection object prediction image of the scaled image; obtain region information of a region where a target detection object is located in the scaled image according to the second target detection object prediction image; and obtain the region where the target detection object is located in the target image according to the region information.

In an embodiment, the object region determining unit is further configured to cut the target image into a plurality of target sub-images according to a cutting rule; input the target sub-images into the target detection object segmentation model to obtain target detection object prediction sub-images corresponding to the target sub-images; and stitch the target detection object prediction sub-images according to the cutting rule to obtain the first target detection object prediction image corresponding to the target image.

In an embodiment, the target detection object segmentation model includes an encoder and a decoder; and the object region determining unit is further configured to input the target image into the encoder of the target detection object segmentation model, and encode the target image by the encoder, to obtain image feature information of the target image; and input the image feature information into the decoder of the target detection object segmentation model, and perform a decoding operation on the image feature information by the decoder, to obtain the first target detection object prediction image corresponding to the target image.

In an embodiment, the feature image obtaining module is configured to input the target detection object image into the heat map prediction network to obtain a feature object heat map corresponding to the target detection object image; obtain a heat value of each pixel of the feature object in the target detection object image according to the feature object heat map; and determine a region where the feature object is located from the feature object heat map according to the heat value to obtain the feature object segmentation image.

In an embodiment, the feature information obtaining module is configured to determine a region where the feature object is located from the feature object segmentation image; crop a region image of the feature object out of the target detection object image according to the region where the feature object is located; and calculate the quantitative feature information of the target detection object according to a pixel value of each pixel in the region image of the feature object.

In an embodiment, the feature information obtaining module is configured to determine a quantity of pixels in a region where the feature object is located from the feature object segmentation image; and obtain a total quantity of pixels in the target detection object image, and calculate a ratio of the quantity of pixels in the region where the feature object is located to the total quantity of pixels, to obtain the quantitative feature information of the target detection object.

In an embodiment, the AI-based object classification apparatus also includes a feature object prediction model training module, configured to: obtain a sample detection object image and a labeled contour region image of a sample feature object in the sample detection object image; obtain a corresponding sample feature object heat map according to the labeled contour region image of the sample feature object; input the sample detection object image into a heat map prediction network of a pre-constructed feature object prediction model to obtain a feature object heat prediction image corresponding to the sample detection object image; calculate a loss value of the feature object prediction model according to the feature object heat prediction image and the sample feature object heat map; and train the heat map prediction network of the feature object prediction model according to the loss value of the feature object prediction model until a convergence condition is met, to obtain a trained feature object prediction model.

In an embodiment, the AI-based object classification apparatus also includes a target detection object segmentation model training module, configured to: obtain a sample image and a labeled contour region image of a sample detection object in the sample image; input the sample image into a pre-constructed detection object segmentation model to obtain a sample detection object prediction image corresponding to the sample image; calculate a loss value of the detection object segmentation model according to the sample detection object prediction image and the labeled contour region image of the sample detection object; and train the detection object segmentation model according to the loss value until a convergence condition is met, to obtain the target detection object segmentation model.

Figure 17:
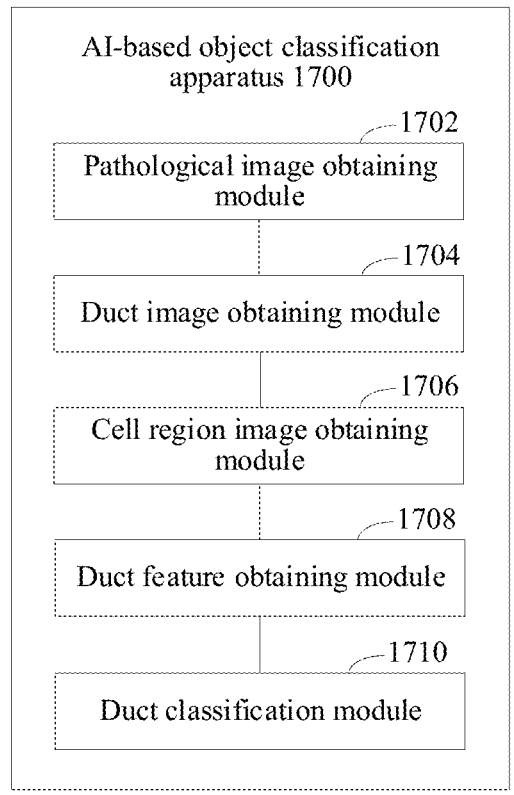
FIG. 17 is a structural block diagram of an AI-based object classification apparatus according to another embodiment.

In an embodiment, as shown in FIG. 17, an AI-based object classification apparatus 1700 is provided, including:

a pathological image obtaining module 1702, configured to obtain a mammary tissue pathological image, the mammary tissue pathological image including a mammary duct;

a duct image obtaining module 1704, configured to separate a mammary duct image of the mammary duct from the mammary tissue pathological image;

a cell region image obtaining module 1706, configured to input the mammary duct image into a feature object prediction model to obtain a cell segmentation image of cells in the mammary duct image;

a duct feature obtaining module 1708, configured to obtain cell feature information and sieve feature information according to the mammary duct image and the cell segmentation image; and a duct classification module 1710, configured to classify the mammary duct image according to the cell feature information and the sieve feature information to obtain lesion category information of the mammary duct in the mammary tissue pathological image.

Figure 18:
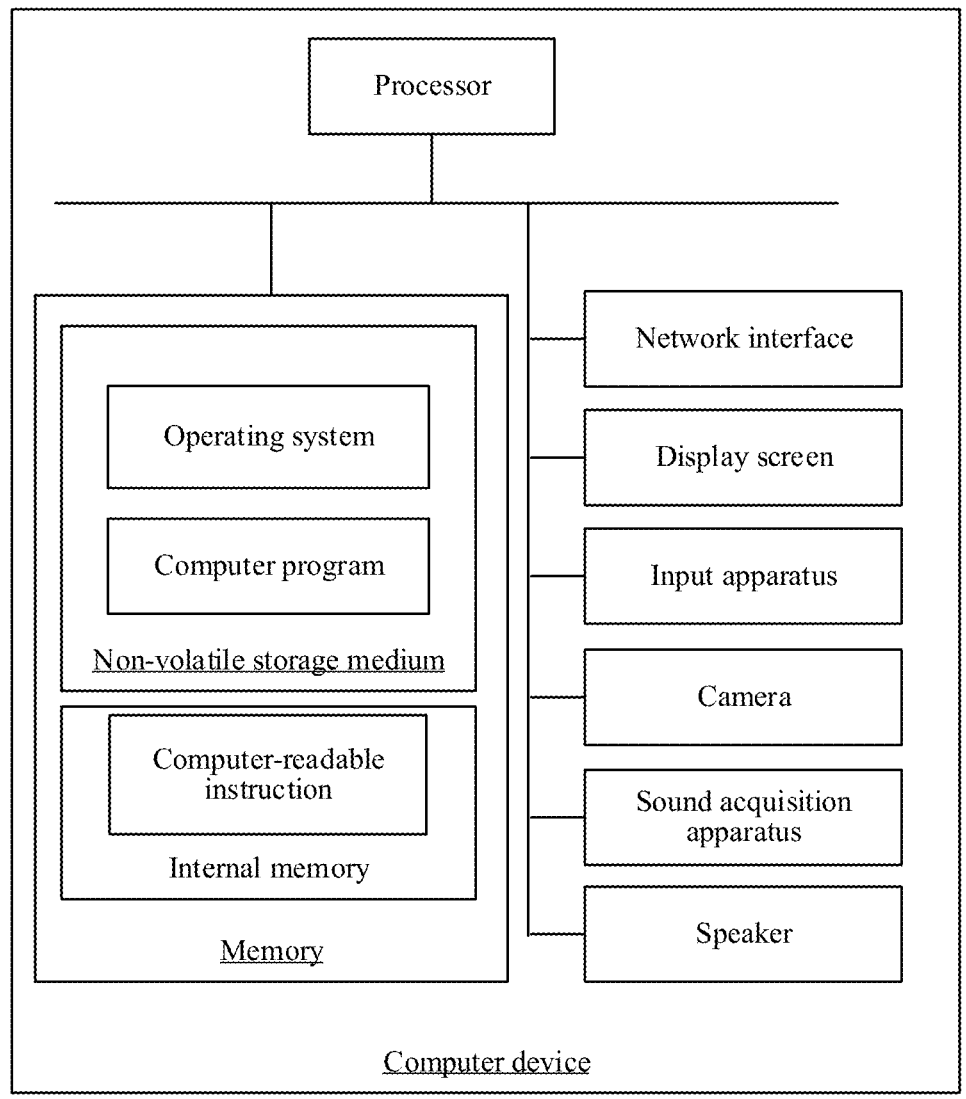
FIG. 18 is a structural block diagram of a computer device according to an embodiment.

FIG. 18 is a diagram of an internal structure of a computer device according to an embodiment. The computer device may be specifically the terminal 110 (or the server 120) in FIG. 1. As shown in FIG. 18, the computer device includes a processor, a memory, a network interface, an input apparatus, and a display screen that are connected by a system bus. The memory includes a non-volatile storage medium and an internal memory. The non-volatile storage medium of the computer device stores an operating system, and may further store a computer-readable instruction. The computer-readable instruction, when executed by the processor, may cause the processor to implement the AI-based object classification method. The internal memory may also store a computer-readable instruction. The computer-readable instruction, when executed by the processor, may cause the processor to implement the AI-based object classification method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that, the structure shown in FIG. 18 is merely a block diagram of a part of a structure related to a solution of the disclosure and does not limit the computer device to which the solution of the disclosure is applied. Specifically, the computer device may include more or fewer components than those in the drawings, or include a combination of some components, or include different component layouts.

In an embodiment, the AI-based object classification apparatus provided in the disclosure may be implemented in a form of a computer-readable instruction, and the computer-readable instruction may run on the computer device shown in FIG. 18. The memory of the computer device may store program modules, units, or code, forming the AI-based object classification apparatus, such as the image obtaining module, the image segmentation module, the feature image obtaining module, the feature information obtaining module, and the object classification module shown in FIG. 16. A computer-readable instruction formed by the program modules, units, or code, causes a processor to perform the operations of the AI-based object classification method in the embodiments of the disclosure.

For example, the computer device shown in FIG. 18 may perform operation S202 by using the image obtaining module in the AI-based object classification apparatus shown in FIG. 16. The computer device may perform operation S204 by using the image segmentation module. The computer device may perform operation S206 by using the feature image obtaining module. The computer device may perform operation S208 by using the feature information obtaining module. The computer device may perform operation S210 by using the object classification module.

In an embodiment, a computer device is provided, including a memory and a processor. The memory stores a computer-readable instruction, the computer-readable instruction, when executed by the processor, causing the processor to perform the operations of the foregoing AI-based object classification method. The operations of the AI-based object classification method herein may be operations of the AI-based object classification method in the foregoing embodiments.

In an embodiment, a computer-readable storage medium is provided, storing a computer-readable instruction, the computer-readable instruction, when executed by the processor, causing the processor to perform the operations of the foregoing AI-based object classification method. The operations of the AI-based object classification method herein may be operations of the AI-based object classification method in the foregoing embodiments.

A person of ordinary skill in the art may understand that all or some of the procedures of the methods of the foregoing embodiments may be implemented by computer-readable instructions instructing relevant hardware. The computer-readable instruction may be stored in a non-volatile computer-readable storage medium. When the computer-readable instruction is executed, the computer-readable instruction may include the procedures of the embodiments of the foregoing methods. Any reference to a memory, a storage, a database, or another medium used in the embodiments provided in the disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the foregoing embodiment are described. However, provided that combinations of the technical features do not conflict with each other, the combinations of the technical features are considered as falling within the scope recorded in this specification.

The foregoing embodiments show only several implementations of the disclosure and are described in detail, which, however, are not to be construed as a limitation to the patent scope of the disclosure. A person of ordinary skill in the art may further make several variations and improvements without departing from the ideas of the disclosure, and such variations and improvements all fall within the protection scope of the disclosure. Therefore, the protection scope of the disclosure is subject to the protection scope of the appended claims.

What is claimed is:

1. An AI-based object classification method, performed by a computer device, the method comprising:

obtaining a target image to be processed, the target image comprising a target detection object;

separating a target detection object image of the target detection object from the target image;

inputting the target detection object image into a feature object prediction model to obtain a feature object segmentation image of a feature object in the target detection object image;

obtaining quantitative feature information of the target detection object according to the target detection object image and the feature object segmentation image; and classifying the target detection object image according to the quantitative feature information to obtain category information of the target detection object in the target image, wherein the obtaining quantitative feature information comprises:

determining a region where the feature object is located and an area value of the region where the feature object is located from the feature object segmentation image;

performing contour extraction on the region where the feature object is located;

calculating a perimeter of a contour of the region where the feature object is located, the perimeter of the contour being represented by a quantity of pixels of the contour of the region where the feature object is located, to calculate an area value of a circle with an equal perimeter; and obtaining a ratio of the area value of the circle with the equal perimeter to the area value of the region where the feature object is located to obtain the quantitative feature information of the feature object in circularity.

2. The AI-based object classification method according to claim 1, wherein the separating comprises:

inputting the target image into a target detection object segmentation model to obtain a first target detection object prediction image corresponding to the target image, and obtaining a region where the target detection object is located in the target image according to the first target detection object prediction image; and segmenting the target image according to the region where the target detection object is located to obtain the target detection object image.

3. The AI-based object classification method according to claim 2, wherein the inputting the target image into a target detection object segmentation model to obtain a first target detection object prediction image corresponding to the target image, and obtaining a region where the target detection object is located in the target image according to the first target detection object prediction image comprises:

scaling the target image to obtain a scaled image;

inputting the scaled image into the target detection object segmentation model to obtain a second target detection object prediction image of the scaled image;

obtaining region information of a region where a target detection object is located in the scaled image according to the second target detection object prediction image; and obtaining the region where the target detection object is located in the target image according to the region information.

4. The AI-based object classification method according to claim 2, wherein the inputting the target image into a target detection object segmentation model to obtain a first target detection object prediction image corresponding to the target image comprises:

cutting the target image into a plurality of target sub-images to be processed according to a cutting rule;

inputting the target sub-images into the target detection object segmentation model to obtain target detection object prediction sub-images corresponding to the target sub-images; and stitching the target detection object prediction sub-images according to the cutting rule to obtain the first target detection object prediction image corresponding to the target image.

5. The AI-based object classification method according to claim 2, wherein the target detection object segmentation model comprises an encoder and a decoder; and the inputting the target image into a target detection object segmentation model to obtain a first target detection object prediction image corresponding to the target image comprises:

inputting the target image into the encoder of the target detection object segmentation model, and encoding the target image by the encoder to obtain image feature information of the target image; and inputting the image feature information into the decoder of the target detection object segmentation model, and performing a decoding operation on the image feature information by the decoder to obtain the first target detection object prediction image corresponding to the target image.

6. The AI-based object classification method according to claim 1, wherein the feature object prediction model comprises a heat map prediction network; and the inputting comprises:

inputting the target detection object image into the heat map prediction network to obtain a feature object heat map corresponding to the target detection object image;

obtaining a heat value of each pixel of the feature object in the target detection object image according to the feature object heat map; and determining a region where the feature object is located from the feature object heat map according to the heat value to obtain the feature object segmentation image.

7. An AI-based object classification apparatus, comprising:

at least one memory configured to store program code; and at least one processor configured to read the program code and operate as instructed by the program code, the program code comprising:

image obtaining code configured to cause the at least one processor to obtain a target image to be processed, the target image comprising a target detection object;

image segmentation code configured to cause the at least one processor to separate a target detection object image of the target detection object from the target image;

feature image obtaining code configured to cause the at least one processor to input the target detection object image into a feature object prediction model to obtain a feature object segmentation image of a feature object in the target detection object image;

feature information obtaining code configured to cause the at least one processor to obtain quantitative feature information of the target detection object according to the target detection object image and the feature object segmentation image; and object classification code configured to cause the at least one processor to classify the target detection object image according to the quantitative feature information to obtain category information of the target detection object in the target image, wherein the feature information obtaining code is further configured to cause the at least one processor to:

determine a region where the feature object is located and an area value of the region where the feature object is located from the feature object segmentation image;

perform contour extraction on the region where the feature object is located;

calculate a perimeter of a contour of the region where the feature object is located, the perimeter of the contour being represented by a quantity of pixels of the contour of the region where the feature object is located, to calculate an area value of a circle with an equal perimeter; and obtain a ratio of the area value of the circle with the equal perimeter to the area value of the region where the feature object is located to obtain the quantitative feature information of the feature object in circularity.

8. The AI-based object classification apparatus according to claim 7, wherein the image segmentation code comprises:

object region determining code configured to cause the at least one processor to input the target image into a target detection object segmentation model to obtain a first target detection object prediction image corresponding to the target image, and obtain a region where the target detection object is located in the target image according to the first target detection object prediction image; and object region segmentation code configured to cause the at least one processor to segment the target image according to the region where the target detection object is located to obtain the target detection object image.

9. The AI-based object classification apparatus according to claim 8, wherein the image segmentation code further comprises:

image scaling code configured to cause the at least one processor to scale the target image to obtain a scaled image; and the object region determining code is further configured to cause the at least one processor to:

input the scaled image into the target detection object segmentation model to obtain a second target detection object prediction image of the scaled image;

obtain region information of a region where a target detection object is located in the scaled image according to the second target detection object prediction image; and obtain the region where the target detection object is located in the target image according to the region information.

10. The AI-based object classification apparatus according to claim 8, wherein the object region determining code is further configured to cause the at least one processor to:

cut the target image into a plurality of target sub-images to be processed according to a cutting rule;

input the target sub-images into the target detection object segmentation model to obtain target detection object prediction sub-images corresponding to the target sub-images; and stitch the target detection object prediction sub-images according to the cutting rule to obtain the first target detection object prediction image corresponding to the target image.

11. The AI-based object classification apparatus according to claim 8, wherein the target detection object segmentation model comprises an encoder and a decoder; and the object region determining code is further configured to cause the at least one processor to:

input the target image into the encoder of the target detection object segmentation model, and encode the target image by the encoder to obtain image feature information of the target image; and input the image feature information into the decoder of the target detection object segmentation model, and perform a decoding operation on the image feature information by the decoder to obtain the first target detection object prediction image corresponding to the target image.

12. The AI-based object classification apparatus according to claim 7, wherein the feature object prediction model comprises a heat map prediction network; and the feature image obtaining code is further configured to cause the at least one processor to:

input the target detection object image into the heat map prediction network to obtain a feature object heat map corresponding to the target detection object image;

obtain a heat value of each pixel of the feature object in the target detection object image according to the feature object heat map; and determine a region where the feature object is located from the feature object heat map according to the heat value to obtain the feature object segmentation image.

13. A non-transitory computer-readable storage medium, storing a computer program that when executed by at least one processor causes the at least one processor to:

obtain a target image to be processed, the target image comprising a target detection object;

separate a target detection object image of the target detection object from the target image;

input the target detection object image into a feature object prediction model to obtain a feature object segmentation image of a feature object in the target detection object image;

obtain quantitative feature information of the target detection object according to the target detection object image and the feature object segmentation image; and classify the target detection object image according to the quantitative feature information to obtain category information of the target detection object in the target image, wherein the obtain quantitative feature information comprises:

determining a region where the feature object is located and an area value of the region where the feature object is located from the feature object segmentation image;

performing contour extraction on the region where the feature object is located;

calculating a perimeter of a contour of the region where the feature object is located, the perimeter of the contour being represented by a quantity of pixels of the contour of the region where the feature object is located, to calculate an area value of a circle with an equal perimeter; and obtaining a ratio of the area value of the circle with the equal perimeter to the area value of the region where the feature object is located to obtain the quantitative feature information of the feature object in circularity.

14. The non-transitory computer-readable storage medium according to claim 13, wherein the separate comprises:

inputting the target image into a target detection object segmentation model to obtain a first target detection object prediction image corresponding to the target image, and obtaining a region where the target detection object is located in the target image according to the first target detection object prediction image; and segmenting the target image according to the region where the target detection object is located to obtain the target detection object image.

15. The non-transitory computer-readable storage medium according to claim 14, wherein the inputting the target image into a target detection object segmentation model to obtain a first target detection object prediction image corresponding to the target image, and obtaining a region where the target detection object is located in the target image according to the first target detection object prediction image comprises:

scaling the target image to obtain a scaled image;

inputting the scaled image into the target detection object segmentation model to obtain a second target detection object prediction image of the scaled image;

obtaining region information of a region where a target detection object is located in the scaled image according to the second target detection object prediction image; and obtaining the region where the target detection object is located in the target image according to the region information.

16. The non-transitory computer-readable storage medium according to claim 14, wherein the inputting the target image into a target detection object segmentation model to obtain a first target detection object prediction image corresponding to the target image comprises:

cutting the target image into a plurality of target sub-images to be processed according to a cutting rule;

inputting the target sub-images into the target detection object segmentation model to obtain target detection object prediction sub-images corresponding to the target sub-images; and stitching the target detection object prediction sub-images according to the cutting rule to obtain the first target detection object prediction image corresponding to the target image.

\* \* \* \* \*